United States Patent
Konishi

(10) Patent No.: US 11,323,623 B2
(45) Date of Patent: May 3, 2022

(54) IMAGE STABILIZATION APPARATUS, METHOD OF CONTROLLING THE SAME, AND STORAGE MEDIUM

(71) Applicant: CANON KABUSHIKI KAISHA, Tokyo (JP)

(72) Inventor: Kazuki Konishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/130,992

(22) Filed: Dec. 22, 2020

(65) Prior Publication Data

US 2021/0203850 A1    Jul. 1, 2021

(30) Foreign Application Priority Data

Dec. 25, 2019  (JP) .............................. JP2019-234653

(51) Int. Cl.
   *H04N 5/232* (2006.01)
   *G06T 7/246* (2017.01)
   *G06T 5/00* (2006.01)

(52) U.S. Cl.
   CPC ......... *H04N 5/23254* (2013.01); *G06T 5/003* (2013.01); *G06T 7/246* (2017.01); *H04N 5/23218* (2018.08); *H04N 5/23264* (2013.01); *H04N 5/23267* (2013.01); *H04N 5/232127* (2018.08)

(58) Field of Classification Search
   CPC ........... H04N 5/23251; H04N 5/23254; H04N 5/23264–23287; G06T 7/246–251
   See application file for complete search history.

(56) References Cited

U.S. PATENT DOCUMENTS

| | | | |
|---|---|---|---|
| 2010/0118156 A1 | 5/2010 | Saito | |
| 2016/0165139 A1* | 6/2016 | Takayanagi | ........ H04N 5/23261 348/208.4 |
| 2016/0360114 A1* | 12/2016 | Abe | ........................ H04N 5/232 |
| 2017/0257573 A1* | 9/2017 | Abe | ........................ G06T 7/97 |
| 2020/0357126 A1* | 11/2020 | Takahashi | ........ H04N 5/232939 |

FOREIGN PATENT DOCUMENTS

| | | |
|---|---|---|
| JP | 08-009227 A | 1/1996 |
| JP | 3143173 B | 3/2001 |
| JP | 2007-201534 A | 8/2007 |

* cited by examiner

*Primary Examiner* — Paul M Berardesca
(74) *Attorney, Agent, or Firm* — Cowan, Liebowitz & Latman, P.C.

(57) ABSTRACT

An image stabilization apparatus includes a subject detection unit, a motion vector detection unit, a separation unit for separating a motion vector of a main subject and that of a background, a calculation unit for calculating a correction amount for correcting image blur, and a control unit for controlling, in a case where a second main subject is detected, so as to transition from a state in which the calculation unit calculates the correction amount based on a first motion vector of the first main subject, via a state in which the correction amount is calculated based on the third motion vector of the background, to a state in which the correction amount is calculated based on a second motion vector of the second main subject.

15 Claims, 17 Drawing Sheets

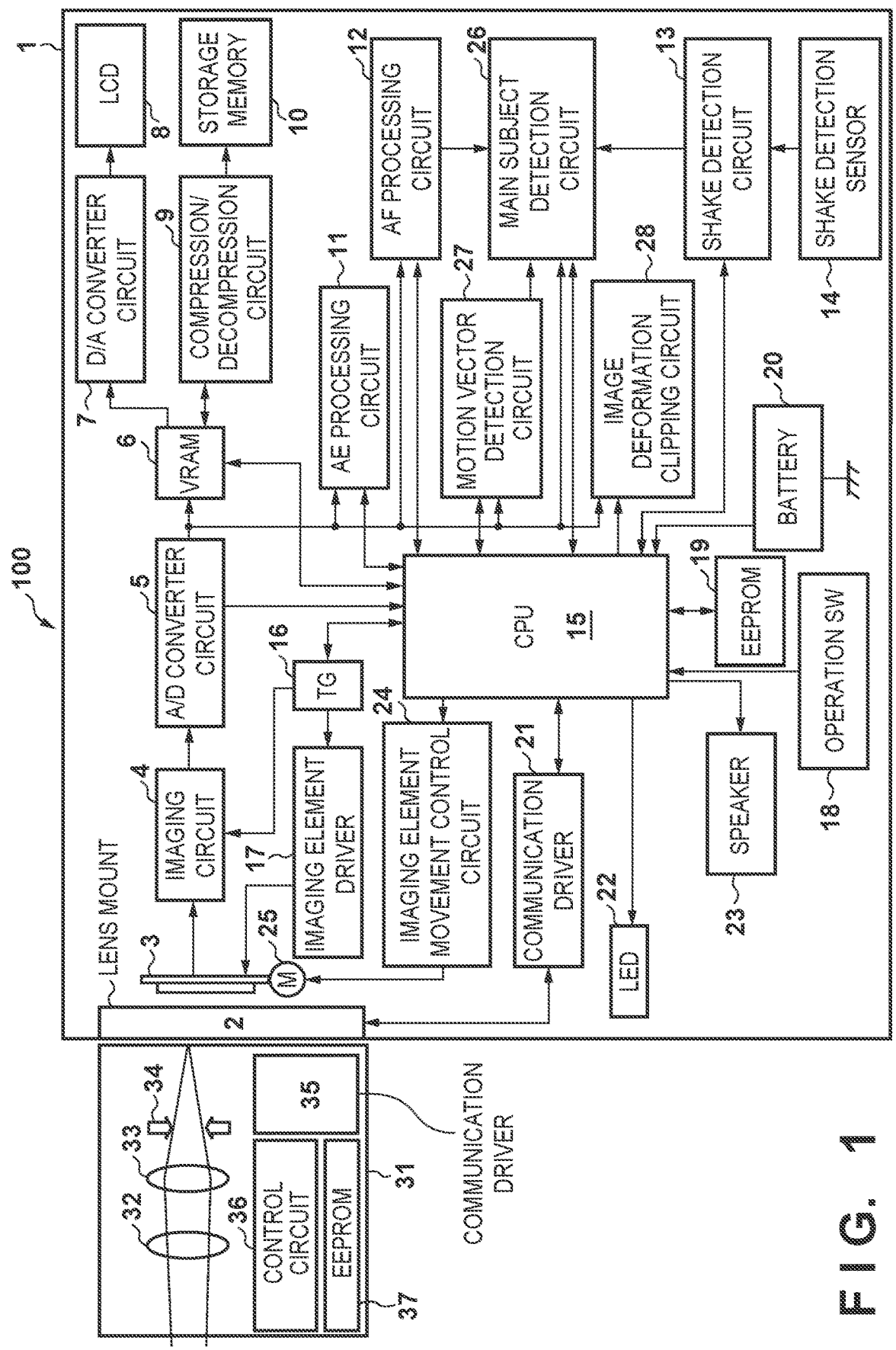
F I G. 1

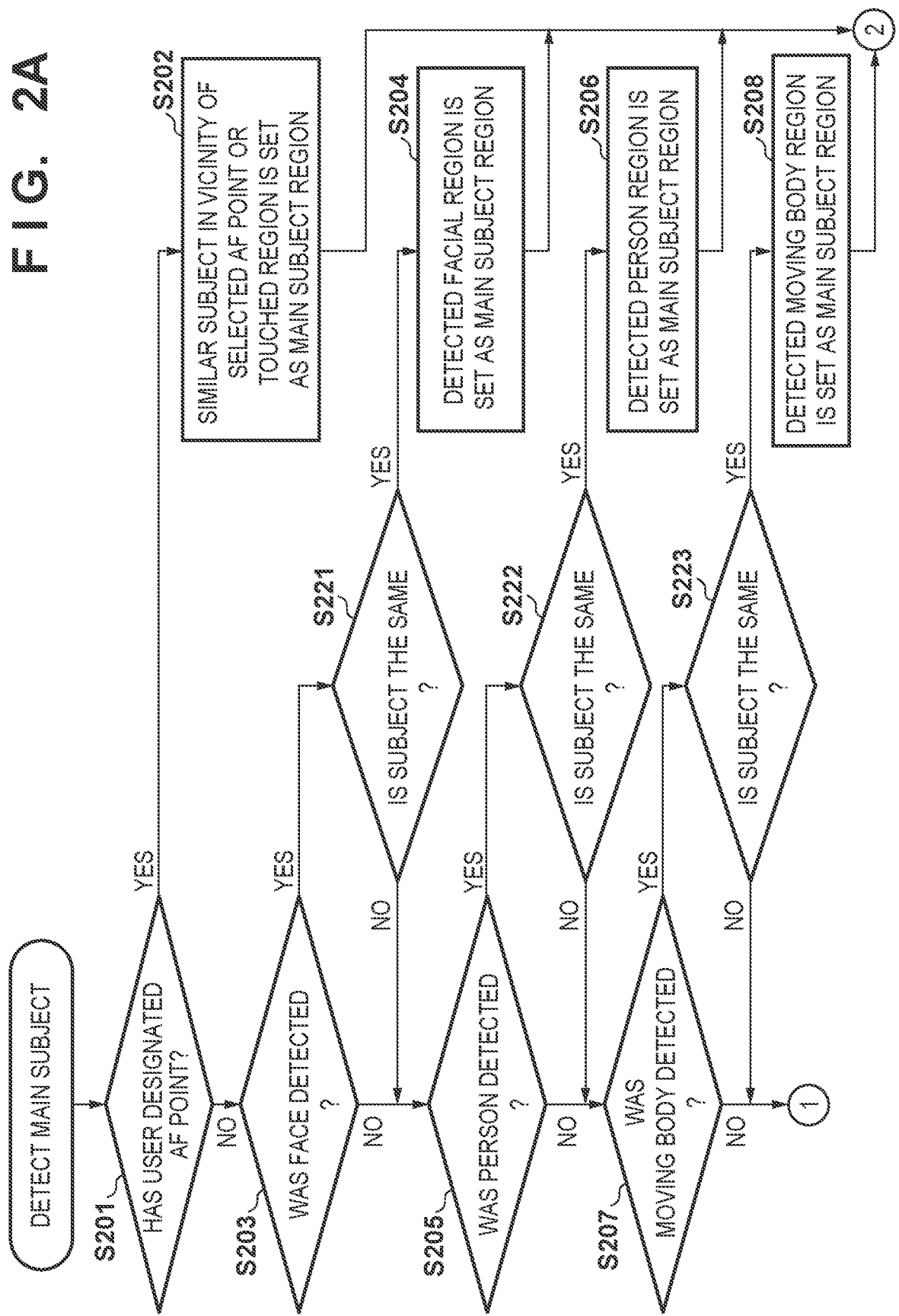

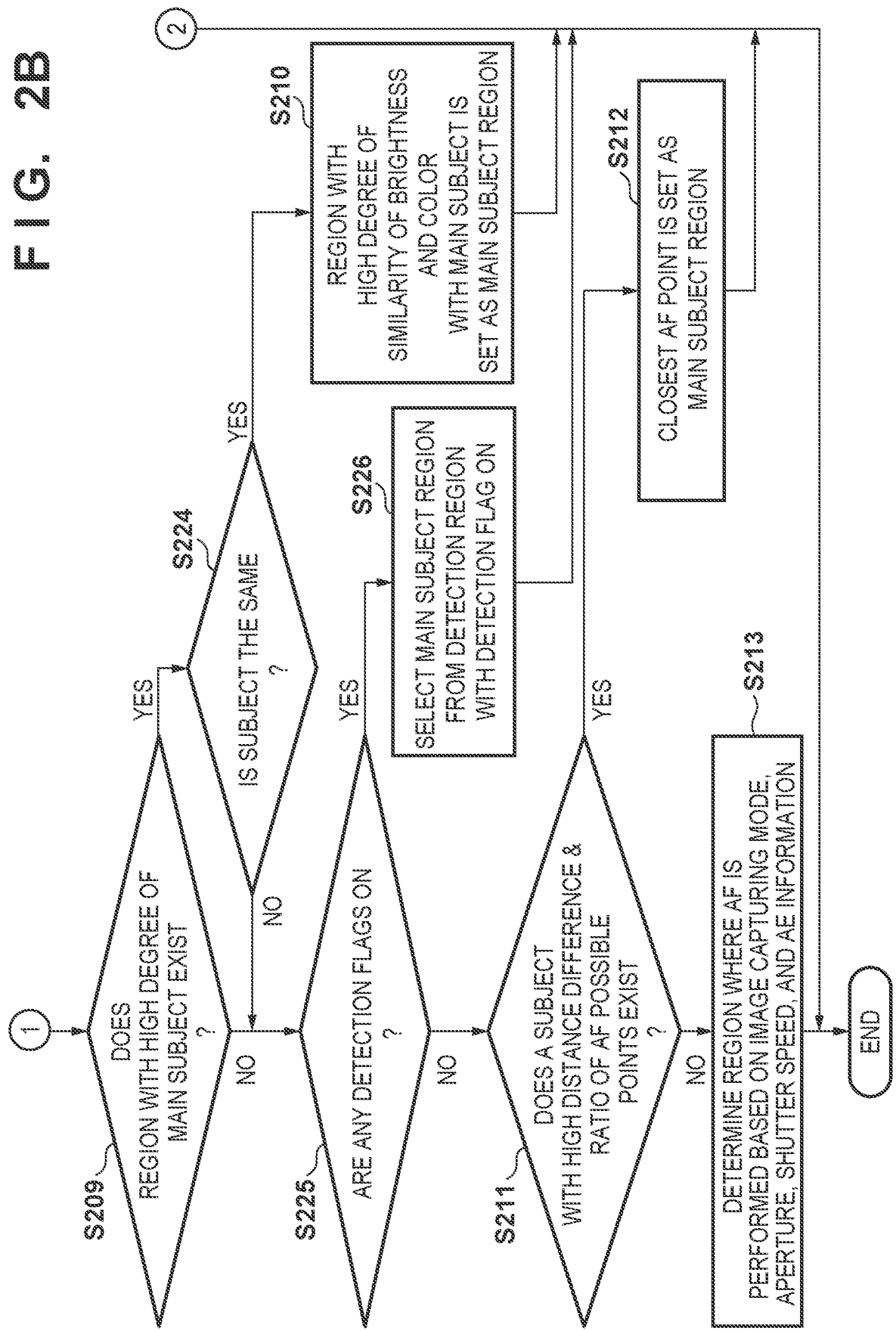

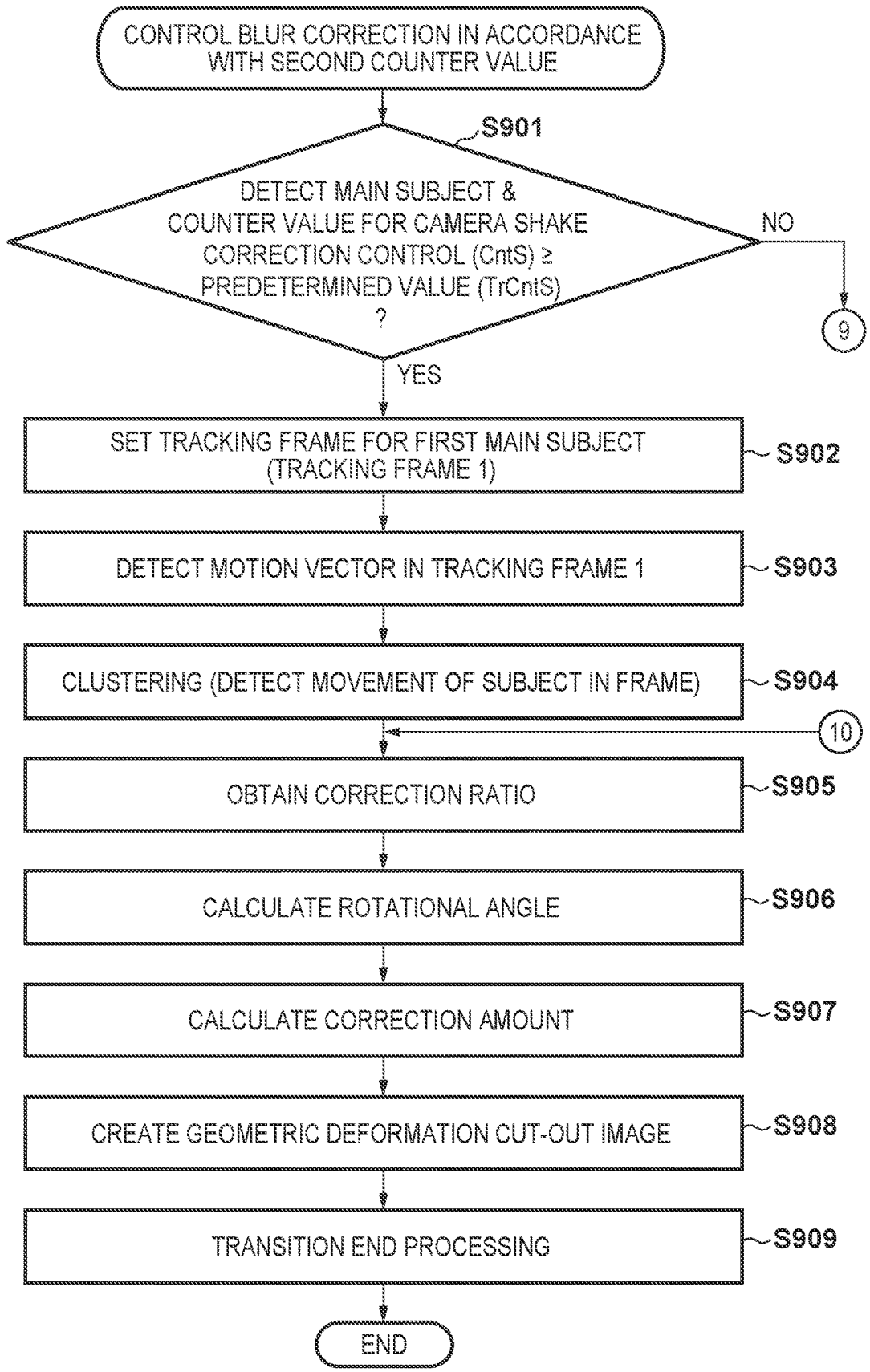

IMAGE STABILIZATION APPARATUS, METHOD OF CONTROLLING THE SAME, AND STORAGE MEDIUM

BACKGROUND OF THE INVENTION

Field of the Invention

The present invention relates to a technique for correcting image blur in an image capturing apparatus.

DESCRIPTION OF THE RELATED ART

For image blur occurring on a subject of the captured image, there is blur caused by movement of an image capturing apparatus such as camera shake and blur caused by movement of the subject. In order to provide a stable composition by correcting image blur and tracking the intended subject (main subject) of the photographer, it is necessary to identify the main subject and detect the movement of the main subject separated from the movement of other subjects such as the background. Also, it is necessary to correct so that the main subject can be continuously captured at substantially the same position of the screen.

Various proposals have been made in order to achieve this purpose; Japanese Patent Laid-Open No. 8-9227 discloses that "a means for changing the angle of view is controlled based on position information of an extracted object so that and identified object to be tracked is positioned in the center of an image capture screen in order to provide highly stable control when a subject that being tracked is lost, or a plurality of subjects approach or cross each other, etc., and when an object is lost from the screen, the appearance of the object is awaited at its position before it was lost."

In Japanese Patent Laid-Open No, 2007-201534, "If face detection is performed but no face is detected, when the shutter button is fully pressed, the correction lens is moved in a direction and speed that cancel the detected camera shake at the same time that an actual image capture is performed. In a case where a face is detected, a shutter button is half-pressed and a motion vector detection circuit 44 detects a subject shake. When the shutter button is fully pressed, the correction lens is moved in a direction and speed that cancel the subject shake, and at the same time, an actual image capture is performed" is recited.

However, in control of waiting for an object to appear at the position where it was lost as in Japanese Patent Laid-Open No. 8-9227, in a case where the object is lost, it is impossible to correct image blur before the subject appears.

In addition, in a case where the control for switching camera shake correction and subject shake correction according to capturing conditions such as the presence or absence of face detection is adopted during moving image recording, it is expected that a video that gives the viewer a sense of unnaturalness, such as when a sudden increase in image blur in the portion where shake correction has been performed so far at the time of switching, will be captured.

SUMMARY OF THE INVENTION

The present invention has been made in view of the aforementioned problems, and provides a video in which a sudden change in image stabilization is suppressed and a viewer can view the video without feeling a sense of unnaturalness.

According to a first aspect of the present invention, there is provided an image stabilization apparatus, comprising: at least one processor or circuit configured to function as: a subject detection unit configured to detect a main subject; a motion vector detection unit configured to detect a motion vector within a screen; a separation unit configured to separate a motion vector of a main subject and a motion vector of a background; a calculation unit configured to calculate a correction amount for correcting image blur of a subject within a screen; and a control unit configured to, in a case where a second main subject, which is a new moving body, is detected by the subject detection unit in a state in which a target of image stabilization is set as a first main subject detected by the subject detection unit, perform control so as to transition from a state in which the calculation unit calculates the correction amount based on a first motion vector of the first main subject, via a state in which the correction amount is calculated based on a third motion vector, which is a motion vector of the background, to a state in which the correction amount is calculated based on a second motion vector of the second main subject.

According to a second aspect of the present invention, there is provided a method of controlling an image stabilization apparatus, the method comprising: detecting a main subject; detecting a motion vector within a screen; separating a motion vector of a main subject and a motion vector of a background; calculating a correction amount for correcting image blur of a subject within a screen; and controlling, in a case where a second main subject, which is a new moving body, is detected by the subject detection in a state in which a target of image stabilization is set as a first main subject detected by the subject detection, so as to transition from a state in which the calculation calculates the correction amount based on a first motion vector of the first main subject, via a state in which the correction amount is calculated based on the third motion vector, which is a motion vector of the background, to a state in which the correction amount is calculated based on a second motion vector of the second main subject.

Further features of the present invention will become apparent from the following description of exemplary embodiments with reference to the attached drawings.

BRIEF DESCRIPTION OF THE DRAWINGS

FIG. 1 is a block diagram illustrating a configuration of an image capturing apparatus according to a first embodiment of the present invention.

FIGS. 2A and 2B are flowcharts illustrating a procedure of a main subject detection operation.

FIGS. 9A and 9B are views for describing a blur correction control according to a second counter value in the first embodiment.

DESCRIPTION OF THE EMBODIMENTS

Figure 3A:
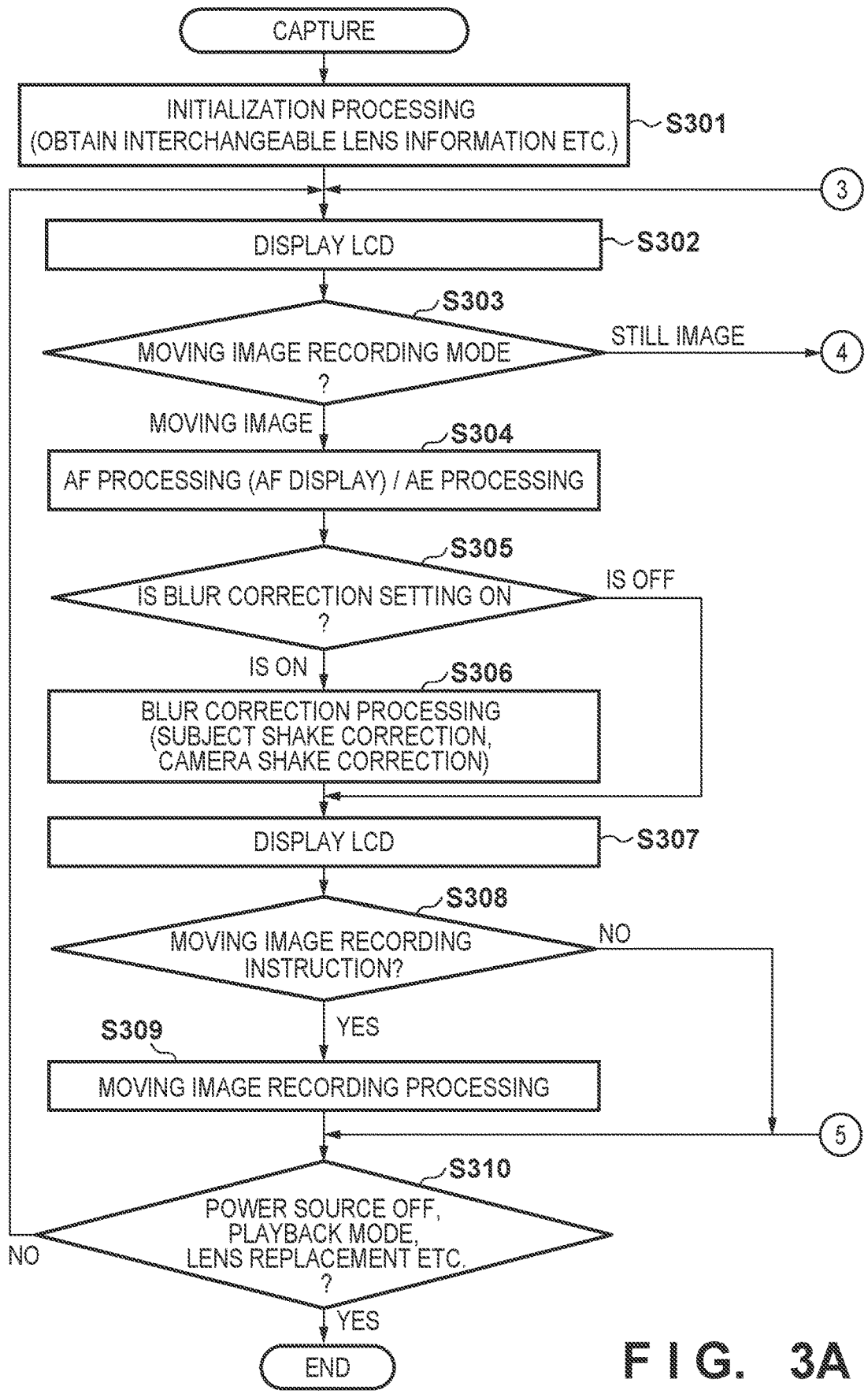
FIGS. 3A and 3B are flowcharts illustrating the procedure of an image capture operation in the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration of an image capturing apparatus according to a first embodiment of the present invention. In FIG. 1, an image capturing apparatus 100 is configured by an interchangeable lens 31 detachably mounted to an image capturing apparatus main body 1.

In the image capturing apparatus main body 1, a lens mount 2 is arranged for mounting the interchangeable lens 31. The light transmitted through an optical imaging system in the interchangeable lens 31 is formed as a subject image, and an imaging element 3 photoelectrically converts that light. An imaging circuit 4 generates a predetermined image signal by performing various image processing on the electrical signal photoelectrically converted by the imaging element 3. An A/D converter circuit 5 converts the analog image signal generated by the imaging circuit 4 to a digital image signal. A memory (VRAM) 6 composed of a buffer memory or the like receives the output of the A/D converter circuit 5 and temporarily stores the image data. A D/A converter circuit 7 reads the image data stored in the VRAM 6, and converts the analog image signal to a form suitable for reproducing output. Image display device such as a liquid crystal display device (LCD) (hereinafter LCD) 8 displays the image signal. A storage memory 10 is configured by a semiconductor memory or the like, and stores image data.

A compression/decompression circuit 9 has a compression circuit for performing compression processing and encoding processing of image data in order to read out the image data temporarily stored in the VRAM 6 and to make the image data into a form suitable for storage in the storage memory 10. In addition, a decompression circuit for performing decoding processing, decompression processing, or the like for making the image data stored in the storage memory 10 into an optimal form for reproduction and display or the like is also included. An AE processing circuit 11 performs automatic exposure (AE) processing by receiving an output from the A/D converter circuit 5. An AF processing circuit 12 generates an AF evaluation value for performing automatic focus adjustment (AF) processing by receiving an output from the A/D converter circuit 5, and further detects a defocus amount.

A shake detection sensor 14 detects the movement of the image capturing apparatus 100 such as camera shake. A shake detection circuit 13 processes the signal of the shake detection sensor 14. A CPU 15 includes a microcomputer having a built-in arithmetic operation memory for controlling the entire image capturing apparatus 100. A timing generator 16 (hereinafter a TG) generates a predetermined timing signal. An imaging element driver 17 drives the imaging element 3. Operation switches 18 are configured by various switch groups. An EEPROM 19 is an electrically rewritable read-only memory in which programs for performing various control, data used for performing various operations, and the like are stored in advance.

A battery 20 is a power source of the entire image capturing apparatus 100. A communication driver 21 is a circuit for communicating with the interchangeable lens 31. A display element 22 is made of an LED or the like for performing a warning display or the like. An imaging element movement motor 25 is a driving source for moving the imaging element 3 in the horizontal direction, the vertical direction, and the rotation direction. An imaging element movement control circuit 24 controls the operation of the imaging element movement motor 25. A motion vector detection circuit 27 performs processing for detecting a motion vector of the subject in response to an output from the A/D converter circuit 5. A main subject detection circuit 26 performs main subject detection processing by receiving an output from the motion vector detection circuit 27, the A/D converter circuit 5, and the CPU 15. An image deformation clipping circuit 28 performs image processing such as rotation and scaling or trimming (cut out) of an image. A speaker 23 is a sound source for performing in-focus notifications, out-of-focus warnings, or the like.

On the other hand, in the interchangeable lens 31, a shake correction lens 32 is an optical system for moving the subject image on the image plane of the imaging element 3 in order to correct image blur. A focus lens 33 is an optical system for adjusting focus by adjusting a focus position in the optical axis direction of the subject image. An aperture 34 is a light amount adjusting means for controlling the amount of light transmitted through the optical imaging system comprising the shake correction lens 32, the focus lens 33, and the like. A communication driver 35 is a circuit for communicating with the image capturing apparatus main body 1. A control circuit 36 controls an aperture drive motor for driving the aperture 34, a focus drive motor for driving the focus lens 33, and a shake correction lens drive motor for driving the shake correction lens 32. An EEPROM 37 is an electrically rewritable read-only memory in which programs for performing various control, data used for performing various operations, and the like are stored in advance.

Note, a fixed type semiconductor memory such as a flash memory or a semiconductor memory such as a card type flash memory having a card shape or a stick shape which is detachably mounted to the apparatus is used as the storage memory 10 which is a storage medium for image data and the like. Alternatively, a magnetic storage medium such as a hard disk or a floppy (registered trademark) disk may be used, and other various forms are applicable.

Further, as the operation switches 18, there is a main power switch for supplying power to activate the image capturing apparatus main body 1, a release switch for starting the moving image capture operation (recording operation) or the like, and a playback switch or the like for starting a playback operation. The release switch is configured by a two-stage switch having a first stroke (hereinafter SW1) and a second stroke (hereinafter SW2). When SW1 is turned ON, an instruction signal for starting an image capture preparation operation such as the AE processing or AF processing performed prior to the image capture operation is generated. When SW2 is turned ON, an instruction signal for starting an actual exposure operation is generated.

Description is given hereinafter regarding operations of the image capturing apparatus of the present embodiment configured as described above.

First, light flux from a subject whose amount of light was adjusted is formed through the interchangeable lens 31 onto a light receiving surface of the imaging element 3. The subject image is converted into an electrical signal by photoelectric conversion processing by the imaging element 3 and is outputted to the imaging circuit 4. In the imaging circuit 4, various signal processing is performed on the input signal, and a predetermined image signal is generated. After the image signal is converted into a digital signal (image data) outputted from the A/D converter circuit 5, it is temporarily stored in the VRAM 6. After image data stored in the VRAM 6 is outputted to the D/A converter circuit 7 and is converted into an analog image signal of a form suitable for displaying, it is displayed as an image on an LCD 8.

The image data stored in the VRAM 6 is also outputted to the compression/decompression circuit 9. After compression processing is performed by the compression circuit in the compression/decompression circuit 9, the image data is converted into a form suitable for storage and is stored in the storage memory 10.

Also, for example, when the playback switch (not shown) of the operation switches 18 is turned on, a playback operation is started. Then, the image data stored in a compressed form in the storage memory 10 is outputted to the compression/decompression circuit 9, and after the image data is subjected to decoding processing, decompression processing, or the like in the decompression circuit, the image data is outputted to the VRAM 6 and is temporarily stored therein. Furthermore, after the image data is outputted to the D/A converter circuit 7 and is converted into an analog image signal of a form suitable for displaying, it is displayed as an image on the LCD 8.

A predetermined timing signal from the TG 16 is outputted to the CPU 15, the imaging circuit 4, and the imaging element driver 17, and the CPU 15 performs various control in synchronization with the timing signal. Further, the imaging circuit 4 receives the timing signal from the TG 16, and performs various image processing such as separating a color signal in synchronization with this. Further, the imaging element driver 17 receives the timing signal of the TG 16 and drives the imaging element 3 in synchronization thereto.

Image data digitized by the A/D converter circuit 5 is also outputted to the AE processing circuit 11, the AF processing circuit 12, the motion vector detection circuit 27, the main subject detection circuit 26, and the image deformation clipping circuit 28 separately from the VRAM 6 described above.

In the AE processing circuit 11, the inputted digital image signal is received and arithmetic processing such as cumulative addition is performed for the brightness value of the image data of one screen. Thus, an AE evaluation value according to the brightness of the subject is calculated. The AE evaluation value is outputted to the CPU 15. Based on the AE evaluation value, the CPU 15 calculates an exposure time of the imaging element 3 or an aperture value of the aperture 34, and transmits this information to the interchangeable lens 31 via the communication driver 21. In accordance with this, aperture drive processing and the like are performed and the aperture amount of the aperture 34 is adjusted to be appropriate on the interchangeable lens 31 side.

In the AF processing circuit 12, an image correction of the image signal obtained by the imaging element 3 having image capturing pixels for focus adjustment and a correlation calculation of the corrected image signal are performed to detect a defocus amount. The image capturing pixels for focus adjustment are configured by a pair of image capturing pixels which is a pair designed to receive light flux from a first region of an exit pupil of the optical system and a second region of the exit pupil of the optical system which is different from the first. The AF processing circuit 12 performs image correction on a base image configured by an output signal from the image capturing pixels for receiving the light flux of the first region (A image) and a reference image configured by an output signal from the image capturing pixels for receiving the light flux of the second region (B image). Thereafter, a correlation calculation of the A image and the B image is performed, and a defocus amount is calculated by multiplying a conversion coefficient (K value) with an image misalignment amount between the obtained A image and B image. This allows imaging plane phase difference AF.

The CPU 15 obtains a drive amount and the drive directions of the focus lens 33, and transmits them to the interchangeable lens 31 via the communication driver 21. Drive processing of the focus lens 33 is performed on the interchangeable lens 31 side in response to this, and it is possible to perform AF control to obtain a focused state.

The motion vector detection circuit 27 receives the inputted digital image signal (base image) and performs a correlation operation with the digital image signal (reference image) of the previous frame in accordance with the region divided by an instruction from the CPU 15. Thus, the motion vector of the subject in the divided region is obtained.

In other words, as a result of performing the difference calculation of the base image and the reference image while shifting the reference image by predetermined pixels in the horizontal and vertical direction, the pixel shift amount obtained with the highest degree of correlation (the smallest amount of difference) is set as a movement amount of the subject in that region. Also, the pixel shift direction in the horizontal direction and the vertical direction at that time is set as a movement direction. As a result, the motion vector of the subject in the region within the frame is obtained. Note, details of the method of obtaining the motion vector are described in PTL3 or the like, and therefore detailed description thereof is omitted.

The main subject detection circuit 26 performs detection of the main subject. First, it is determined whether or not the main subject region has been designated by the photographer. For example, a region in which an AF point is specified by a photographer or a region in which, if a touch panel is mounted on the LCD 8, is subjected to a touch operation for a predetermined time by a photographer is determined as a main subject region.

In addition, in response to the output from the A/D converter circuit 5, a portion characterizing a face such as a pupil or an eyebrow is searched for on the image, a position on the image of a face of a person is detected from the positional relationship, and a size, inclination, or the like of the face is further obtained from the positional relationship such as a spacing of the portion characterizing the face. Similarly, in response to the output from the A/D converter circuit 5, a portion having a shape corresponding to a portion characterizing a person such as a head or a body is searched for on the image and the position of the person present in the screen is detected by evaluating the positional relationship thereof. For example, the presence of a person may be determined in a case where a shape close to a circle is detected, a first rectangular shape exists at the lower portion of the circle, a second rectangle having shorter sides than the first rectangle exists, and these shapes are next to each other.

Further, in response to the output from the A/D converter circuit 5, a group of similar colors and brightnesses is detected, the size or the position on the screen thereof is detected, and from the result, a degree of the subject being the main subject is estimated. For example, if there is a group having similar colors and brightnesses at a position close to the center of the screen at a predetermined size or more, it is determined that the subject is likely the main subject. Also, among the subjects whose size and position on the screen satisfy the predetermined conditions, the region having the highest degree of having the main subject, obtained from the coordinates of the center-of-gravity with the center of the screen as the origin or from the size of the group, is set as the main subject region.

Also, a distance or defocus amount for each AF point in the screen from the processing result of the AF processing circuit 12 is obtained. Then, using the processing result of the motion vector detection circuit 27 and the result of the shake detection circuit 13, the photographer detects a subject moving in real space to be captured in the screen.

Also, from the CPU 15, information such as AF point information, image capturing mode, shutter speed, aperture value which are set by the photographer, including the processing result of the AE processing circuit 11 and what was set by touching the LCD screen, is obtained.

The main subject detection circuit 26 comprehensively detects a plurality of main subject regions from the detection results obtained in this way, and transmits a result of ordering the main subject regions to the CPU 15.

In the present embodiment, the main subject detected by a main subject detector circuit 26 is a first main subject, and the motion vector is detected by the motion vector detection circuit 27. Then, image blur occurring on the first main subject is corrected using the detected motion vector. When a plurality of main subjects are detected, the main subject having the highest ordering is set as the first main subject, and image stabilization is performed on it. In a case where a new main subject having a higher order than the first main subject is detected, control is taken such that image stabilization is gradually performed on the new main subject (second main subject) from what was the main subject thus far (first main subject) via image stabilization of the background (third main subject).

A specific procedure of main subject detection is described with reference to FIGS. 2A and 2B. In this procedure, the higher the priority order of the main subject is, the earlier the main subject is detected.

When the processing is started, firstly, all main subject detection flags are turned off, and then it is determined whether or not a main subject region is designated by the photographer in step S201. This is executed by checking the AF point information sent from the CPU 15, and by checking whether or not any AF point is specified by the photographer by means of a menu, touch operation of the LCD screen, or the like. If specified, the processing advances to step S202.

In step S202, if an AF point is specified by a menu or the like, the AF point is set as a main subject region. In a case where an AF point is not selected by a menu or the like and the main subject intended by the photographer is selected by touching the LCD screen instead, that region and regions in which a subject nearby having similarity thereto are set as the main subject region.

For example, it is checked whether face detection or the like is performed in a selected region nearest to the center of the selected region. Note, the size of the region selected by the user's touch may be determined in advance. The size may be varied by the focal length of the interchangeable lens 31.

If a detected face exists in a predetermined region, the main subject region is determined from the center coordinates and the size of the detected face. Note, in a case where multiple faces are detected, such as when parts of faces enter a predetermined region, a face whose center coordinates of the detected facial region are close to the center of the predetermined region, a face having a larger face size if the coordinates are the same, or a face that was detected earlier if the sizes are the same is selected. Note, in a case where the detected face is large and the pupil can be detected, a region including two pupils or a region including a large pupil is set as the main subject region.

In step S203, it is checked whether or not face detection has been performed, and if a face has been detected, after a face detection flag is turned on, it is determined whether or not the detected face can be regarded as being the same as the main subject up to the previous frame in step S221. If the faces can be regarded as the same, the processing advances to step S204, and the detected facial region is regarded as the main subject region. If not, the processing advances to step S205. Determination of whether or not the face can be regarded as the same is performed using a function of the main subject detection circuit 26 which is described later for tracking a subject estimated to be the same.

In step S205, it is checked whether or not a person has been detected, and if a person has been detected, after a person detection flag is turned on, it is determined whether or not the detected person can be regarded as being the same as the main subject up to the previous frame in step S222. If the people can be regarded as the same, the processing advances to step S206, and the detected person region is regarded as the main subject region. If not, the processing advances to step S207.

In step S207, it is checked whether or not there is a moving body (a subject moving in real space that the photographer is trying to capture within the screen), and if there is, the moving body detection flag is turned on. Thereafter, in step S223, it is determined whether or not the detected moving body can be regarded as the same as the main subject up to the previous frame. If the moving body can be regarded as the same, the processing advances to step S208, and the moving body is regarded as the main subject region. If not, the processing advances to step S209.

Determination of whether a moving body is present is performed using the output of the shake detection circuit 13, the output of the motion vector detection circuit 27, and the output of the AF processing circuit 12. In a case where the output of the shake detection circuit 13 is small (a case where the detected values for the plurality of axes are all less than a predetermined value), i.e. if the photographer is not moving the image capturing apparatus main body 1 when intended, if there is a region whose movement amount of the motion vector detected by the motion vector detection circuit 27 is greater than or equal to a predetermined value, the region is set as the main subject region.

The screen is divided into a plurality of regions (e.g., 256 16×16 regions) in the horizontal and vertical directions, and motion vectors in the horizontal and vertical directions of each detected region are defined as (Vhor (nm), Vver (nm)), respectively. In this case, the movement amount Vu (nm) of the region nm is calculated as follows.

$$Vu(nm)=\sqrt{[Vhor(nm) \times Vhor(nm) + Vver(nm) \times Vver(nm)]}$$

If the value Vu (nm) is equal to or greater than the predetermined value Vc, the region is regarded as a region in which movement is present, and if adjacent, the regions are incorporated. If there is more than one region, the region close to the center of the screen is selected.

In a case where the output of the shake detection circuit 13 is large (a case where the detected values of the plurality of axes are both greater than a predetermined value), i.e. if the photographer is moving the image capturing apparatus main body 1 when intended, the region for which the movement is equal to the intentional movement is set as the main subject region. That is, if there is a region where the movement amount of the motion vector detected by the motion vector detection circuit 27 is equal to or less than a predetermined value, that region is set as the main subject region.

The screen is divided into a plurality of regions, and if the movement amount Vu (nm) of each detected region is equal to or less than a predetermined value Vd, the region is regarded as a region in which a moving body that the photographer is following is present, and adjacent, regions are incorporated. When there are a plurality of regions in which the movement amount of the motion vector detected by the motion vector detection circuit 27 is equal to or less than a predetermined value, one close to the center of the screen is selected.

In a case where a moving body cannot be detected in the process using the output of the motion vector detection circuit 27, whether or not there is a moving body moving in the distance direction (optical axis direction) is checked. This is performed by checking whether an AF point whose amount is changing in the same direction in time series from the distance or defocus amount obtained from the AF processing circuit 12 is present (e.g., an AF point where, for 5 consecutive frames, the distance is approaching). A change in the distance or defocus amount of each frame with respect to all AF points obtained from the AF processing circuit 12 is checked, the AF points that changed a predetermined amount in the same direction over a predetermined number of frames or more are extracted, the AF points are set as regions where a moving body is located, and if regions are adjacent to each other, they are integrated. In a case where there are a plurality of AF point regions that are changing in the same direction by a predetermined amount over a predetermined number of frames or more, an AF point region close to the screen center is selected.

In step S209, it is checked whether or not there is a region that can be considered as a main subject region in which there is a high degree of a main subject being in a group of similar colors and brightnesses, and if present, the main subject detection flag is turned on. Thereafter, in step S224, it is determined whether or not the main subject of the detected main subject region can be regarded as being the same as the main subject up to the previous frame, and if it can be regarded as being the same, the processing advances to step S210, and the region is regarded as the main subject region.

The degree of the main subject is determined by the position and size on the screen of the group with similar color and brightness. Detected groups that do not contact two of the four sides of the screen are selected, and those from among the groups having a size equal to or larger than a predetermined amount are regarded as groups having a high degree of a main subject. If there are a plurality of corresponding groups, a group whose center of gravity position is close to the center of the screen is selected.

In step S224, if the main subject cannot be considered to be the same as the main subject up to the previous frame, the processing advances to step S225.

In step S225, it is determined whether or not a main subject candidate has been detected in the processing up to this point by checking the detection flag, and if any of the detection flags are turned on, it is determined that a main subject candidate has been detected, and the processing advances to step S226.

In step S226, a detection region having a higher priority order from among detection regions in which the detection flag is turned on is selected, and the region is set as a main subject region. If face detection has been performed, the face detection region is set as the main subject region; if a face has not been detected and person has been detected, the person detection region is set as the main subject region; if a face has not been detected and a person has not been detected and a moving body has been detected, the moving body region is set as the main subject region; if none of these has been detected, a detection region determined to have a high degree of a main subject is set as the main subject region.

If a detection flag is not turned on in step S226, the processing advances to step S211 because no main subject candidate is detected in the processing up to this point.

In step S211, it is checked whether the ratio of the number of AF points in the screen in which AF is possible from the processing result of the AF processing circuit 12 is high and there is a subject having a distance difference. In a case where the condition is satisfied, the processing advances to step S212, and the AF point indicating the closest AF result from among the plurality of AF points is set as the main subject region. In this case, it is considered that the entire screen is not a subject photograph, such as with a landscape photograph, but rather it is a photograph with a landscape as the background, and so the closest subject is set as the main subject region. When the condition is not satisfied, in step S213, the region where AF is performed is determined from the AE processing results obtained from the CPU 15, the image capturing mode, the shutter speed, the aperture value, and the flash ON/OFF information by the photographer.

Firstly, based on the image capturing mode, a region in which AF is performed is determined as shown in the following table.

| image capturing mode | associated condition | main subject region |
| --- | --- | --- |
| landscape mode | none | central 60% × 60% region |
| aperture priority mode | the aperture value narrowed by a predetermined value | center 60% × 60% region |
| shutter speed priority mode | shutter speed is faster than predetermined amount | center 20% × 20% region |

When the above conditions are not satisfied, the main subject region is determined as shown in the following table.

| brightness | associated condition | main subject region |
|---|---|---|
| By value < predetermined By value | flash forced ON | center 20% × 20% region |
| By value < predetermined By value | flash Auto, OFF | center 60% × 60% region |
| By value ≥ predetermined By value | none | center 20% × 20% region |

Note, when a plurality f faces, persons, and moving bodies are detected, as described above, the main subject region is determined by the detection position and size (face) or the detection position (person/moving body). In some cases, a main subject having a different priority order is detected, and the main subject region is determined according to the priority order. Incidentally, in the first frame, the main subject region is determined in this way, but after the next frame it is prioritized to be the same subject.

The main subject detection circuit 26 has a function of tracking a subject that is estimated to be the same as the subject detected as the main subject in the previous frame. With this function, in a case where it is estimated that the subject detected as the main subject in the above procedure is the same as the main subject up to the previous frame, the subject is set as the main subject of the highest order. Even if there is a main subject previously detected in the above procedure, the main subject estimated to be the same is prioritized. Therefore, image stabilization for the first main subject is performed. However, in a case where an AF point is specified in a menu or the like in order for the photographer to explicitly specify the main subject, the AF point is excluded.

In the case of performing the determination as described above, it is determined that a new main subject (second main subject) is detected in the following cases. One case is a case when the photographer explicitly designates the main subject. The other case is a case where, if the first main subject has significantly moved up to now, the main subject is not estimated to be the same subject because the position on the screen changes significantly and the like without the photographer intentionally following the subject, and at the same time, a higher order main subject is detected.

In a case where a new main subject (second main subject) is detected, the motion vector (first motion vector) detection of the previous main subject (first main subject) is also performed in parallel. Then, through the step of detecting the motion vector (third motion vector) of the background (third main subject) for blur correction, control is performed gradually so that blur correction is performed based on the detection result of the motion vector (second motion vector) of the new main subject (second main subject).

Next, a function of tracking a subject that is estimated to be the same as the subject detected as the main subject in the previous frame is described. The estimation method of the same subject differs depending on which above described condition the main subject region was detected in.

In a case where an arbitrary AF point is specified by the photographer, a region including the AF point is always set as a main subject region. However, since there is a possibility that the main subject will temporarily move to the adjacent AF point, AF information of AF points adjacent on the top, bottom, left, and right is also obtained. Then, in a case where the AF information of the designated AF point changes significantly and substantially equivalent AF information is obtained at an adjacent AF point, the adjacent AF point is set as the main subject region. In other words, it is not estimated whether the subject is the same subject, rather the subject designated by the photographer when intended is regarded as the main subject.

In a case where the main subject region is determined in accordance with the face detection result or the person detection result, the following processing is performed. If a face or a person is detected, and the face or person is of substantially the same size as what was detected and is at a similar position as in the previous frame (the difference in the center coordinates of the detection result is within a predetermined value), the subject is estimated to be the same subject, and the newly detected region is regarded as the main subject region.

In a case where the moving body is set as the main subject region, the region of the moving body is detected by the above described procedure and the main subject region from the detected position (center coordinates of the region) and the motion vector of the region are selected. If the position and the motion vector of the detected moving body region are the same as those detected in the previous frame, the subject is estimated to be the same subject, and the newly detected region is set as the main subject region.

Note, a quadratic approximation is performed from the motion vectors between several frames (movement amount and direction), the estimation of the movement of the subject is performed, and in a case where the difference in the movement amount calculated from the motion vector with respect to the estimated movement amount is within a predetermined value, the subject is estimated to be the same subject, and the region may be set as a main subject region. Similarly, with respect to a moving body in the distance direction, if the position and the motion vector of a moving body region newly detected is the same as that detected in the previous frame, the subject is estimated to be the same subject, and the newly detected region is set as the main subject region.

Similarly, in a case where a subject having a high degree of being a main subject from among groups with similar colors and brightnesses is set as the main subject region, if a newly detected group with similar colors and brightnesses has the same size and position as those detected in the previous frame, it is presumed to be the same subject. Then, the newly detected region is set as the main subject region.

In a case where the closest subject is set as the main subject region, or like (step S212 of FIG. 2B), a new main subject region is searched for without determining whether or not the subject is estimated to be the same.

Also, in a case of recording stoppage, panning exceeding the angle of view, extreme brightness change, change to the playback mode, power OFF, or the like, it is determined that capturing regarding the main subject up to now has been completed, and the main subject region information detected up to now is erased.

The image deformation clipping circuit 28, in response to the output of the main subject detection circuit 26 and the motion vector detection circuit 27, in order to correct a change in accordance with information relating to top, bottom, left, and right movements or rotation of the image capturing apparatus main body 1 on the image of the main subject calculated by the CPU 15, performs deformation such as image rotation or image processing such as cutting out a portion of the image.

For example, the face of a person detected as a main subject may greatly change its position on the screen due to the movement of the person or camera shake of the photographer, or the main subject may move in an oblique direction. When such shaking between the frames of the moving image or movement of the main subject in the horizontal, vertical, and oblique directions of the screen occurs, a situation where a main subject does not exist at a position on the screen that the photographer desires or unnatural movement occurs. When such a phenomenon frequently occurs between frames, the recorded moving image becomes very difficult to see.

Therefore, motion vectors representing the movement of the main subject in the horizontal direction and the vertical direction between the frames is detected by the motion vector detection circuit 27, and the information for correcting the image by the CPU 15 is calculated from the detected motion vectors. Then, the image is deformed and corrected by the image deformation clipping circuit 28 in accordance with the calculated correction amount, and the generated image is recorded in a predetermined region of the VRAM 6.

Figure 3B:
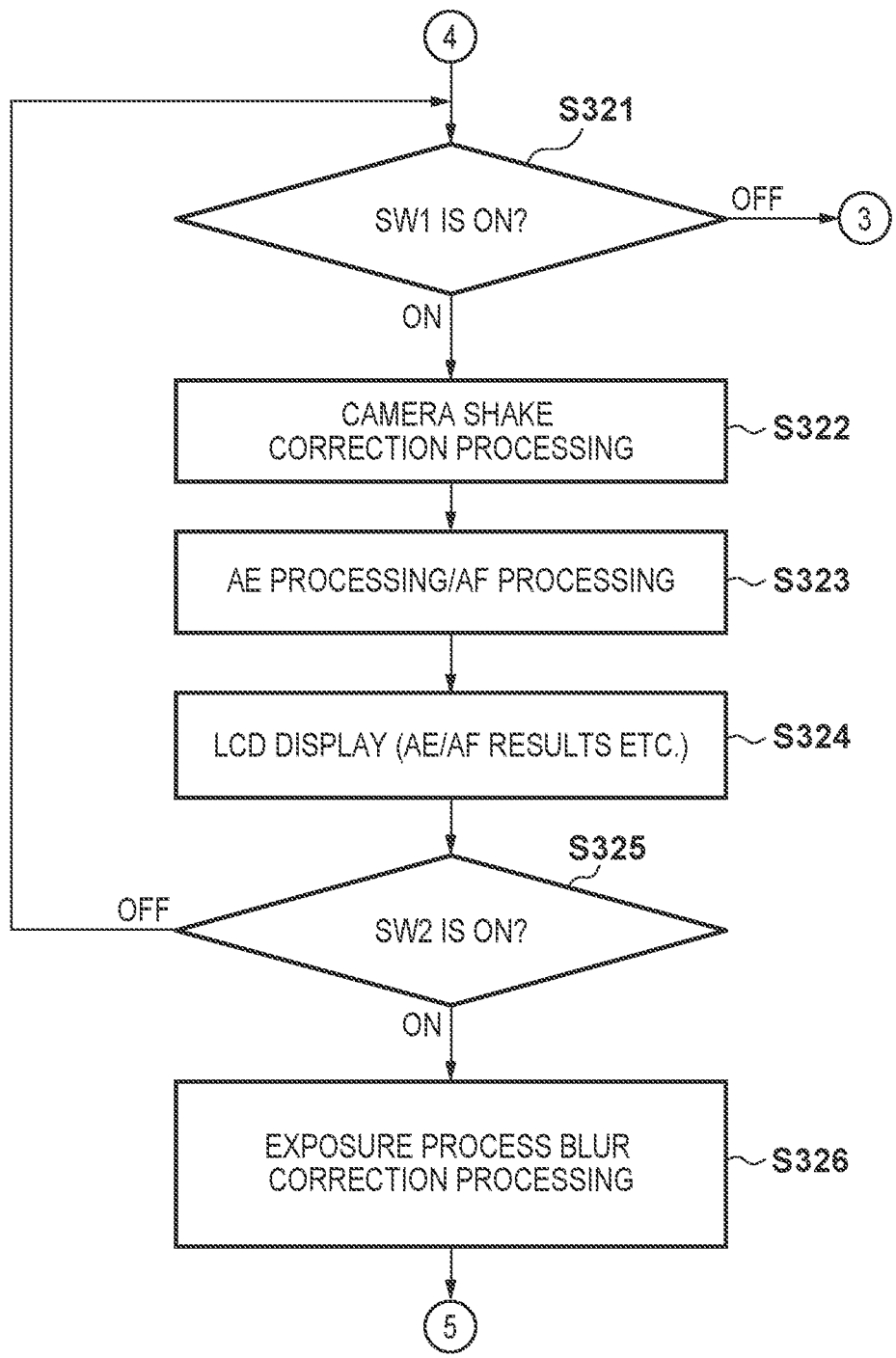

Next, description regarding the actual image capturing operation of the image capturing apparatus of the present embodiment is given using the flowchart illustrated in FIGS. 3A and 3B.

In a case where the main power switch of the image capturing apparatus main body 1 is turned on and the operation mode of the image capturing apparatus is in the capturing (recording) mode, an image capturing processing sequence is executed.

First, in step S301, after performing processing such as initialization of variables or moving a driving member to the initial position, it is determined whether or not the interchangeable lens 31 is mounted. If it is mounted, information relating to the shake correction lens 32, the focus lens 33, and the aperture 34 is obtained. In a case where it is not mounted, processing for obtaining the interchangeable lens information is not performed, and the processing advances to step S302.

In step S302, the CPU 15 displays as an image on the LCD 8 an image formed on the imaging element 3 transmitted through the interchangeable lens 31. In other words, the subject image formed on the imaging element 3, after it is photoelectrically converted by the imaging element 3 and electrically converted to a signal, is output to the imaging circuit 4. In the imaging circuit 4, various signal processing is performed on the input signal, and a predetermined image signal is generated. After this, the image signal is converted into a digital signal (image data) by the A/D converter circuit 5 and is temporarily stored in the VRAM 6. After image data stored in the VRAM 6 is outputted to the D/A converter circuit 7 and is converted into an analog image signal of a form suitable for displaying, it is displayed as an image on the LCD 8.

Note, in a case where the moving image recording mode is set and a blur correction setting is ON, an image that has undergone blur correction processing may be displayed on the LCD.

In step S303, the CPU 15 checks whether the moving image recording mode or the still image capturing mode is set, and advances to step S304 if in the moving image recording mode or to step S321 if in the still image capturing mode.

In step S321, the status of the release switch is confirmed. When CPU 15 confirms that the release switch is operated by the photographer and SW1 is turned on (first stroke of the release switch), the processing advances to the following step S322.

In step S322, in a case where the blur correction processing is set by the photographer, the blur correction processing is performed. For this processing, the blur correction processing and the like in the conventional still image capturing described in PTL2 may be applied, for example, and therefore detailed description of the processing will be omitted.

In step S323, AF processing and AE processing are executed to drive the focus lens 33 to the in-focus position and determine the aperture value, exposure time, and the like at the time of still image capture.

In step S324, the AE processing result (high brightness, low brightness warning, etc.) and the AF processing result (AF succeeded, failed, etc.) is superimposed on the image formed on the imaging element 3, and is displayed as an image on the LCD. Also, configuration may be taken such that the lighting or blinking of an LED 22, generation of a focus sound or non-focus sound from the speaker, and the like notifies the photographer of an AE or AF processing result.

In step S325, SW2 (second stroke of the release switch) is confirmed, and if SW2 is turned on, the processing advances to step S326, and the actual exposure process is executed. In a case where the blur correction setting has been set by the photographer during the exposure processing, the blur correction processing is performed in the same manner as in step S322. After the exposure process is completed, the processing advances to step S310.

On the other hand, in a case where the moving image recording mode is set in step S303, the processing advances to step S304.

In step S304, the CPU 15 executes the AF process and the AE process, performs driving to the in-focus position of the focus lens 33, determines the aperture value and the exposure time, and controls the driving of the aperture 34 and the exposure time (accumulation time) of the imaging element 3.

In step S305, it is checked whether or not the blur correction processing is set by the photographer. If it is set (IS ON: image stabilization ON), the blur correction processing is performed in step S306. On the other hand, in a case where the blur correction processing is not set (IS OFF), the processing advances to step S307. The processing in step S306 will be described later in detail.

In step S307, the AE processing result (high brightness, low brightness warning, etc.) and the AF processing result (AF succeeded, failed, etc.) is superimposed and displayed as an image on the LCD 8. This image is the image after blur correction created by the processing in step S306 in a case where the blur correction processing is set, and is the image read in step S302 when the blur correction processing is not set.

In step S308, it is confirmed whether or not a moving image recording instruction has been made by the photographer, and if the moving image recording instruction has been made, the processing advances to step S309, and after the moving image recording processing is executed, the processing advances to step S310. In this moving image recording processing, in a case where the blur correction processing is set, the blur corrected image created by the processing in step S306 is recorded. In a case where the blur correction processing is not set, images read when display is performed in step S307 are recorded. If the moving image recording instruction has not been issued, the processing advances to step S310.

In step S310, the state of the main power switch and the playback switch, or a replacement of the lens is checked, and if any have been executed, the processing is terminated. Otherwise, the processing returns to step S302.

Figure 4A:
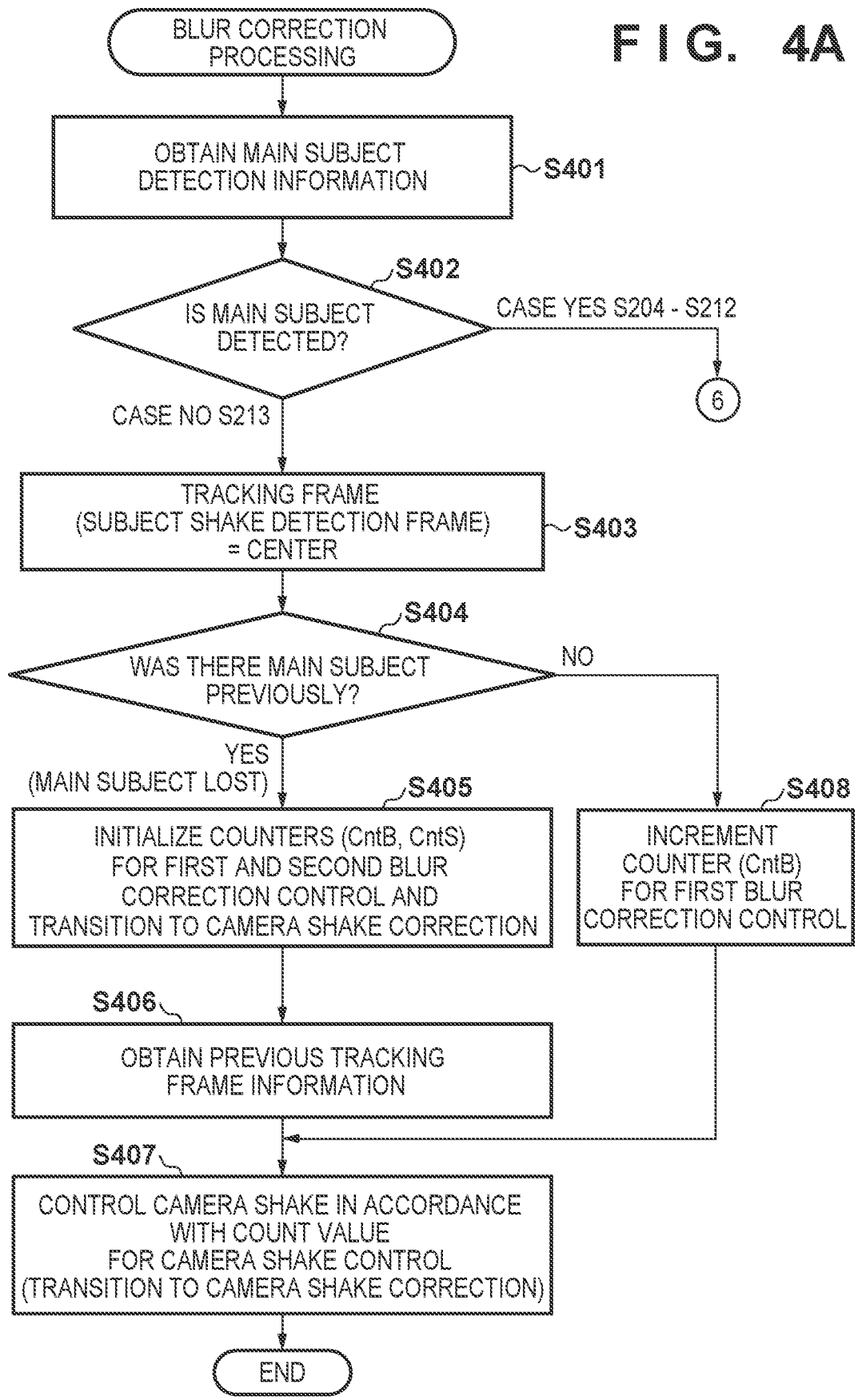
FIGS. 4A and 4B are flowcharts illustrating the procedure of a blur correction processing operation in the first embodiment.
Figure 4B:
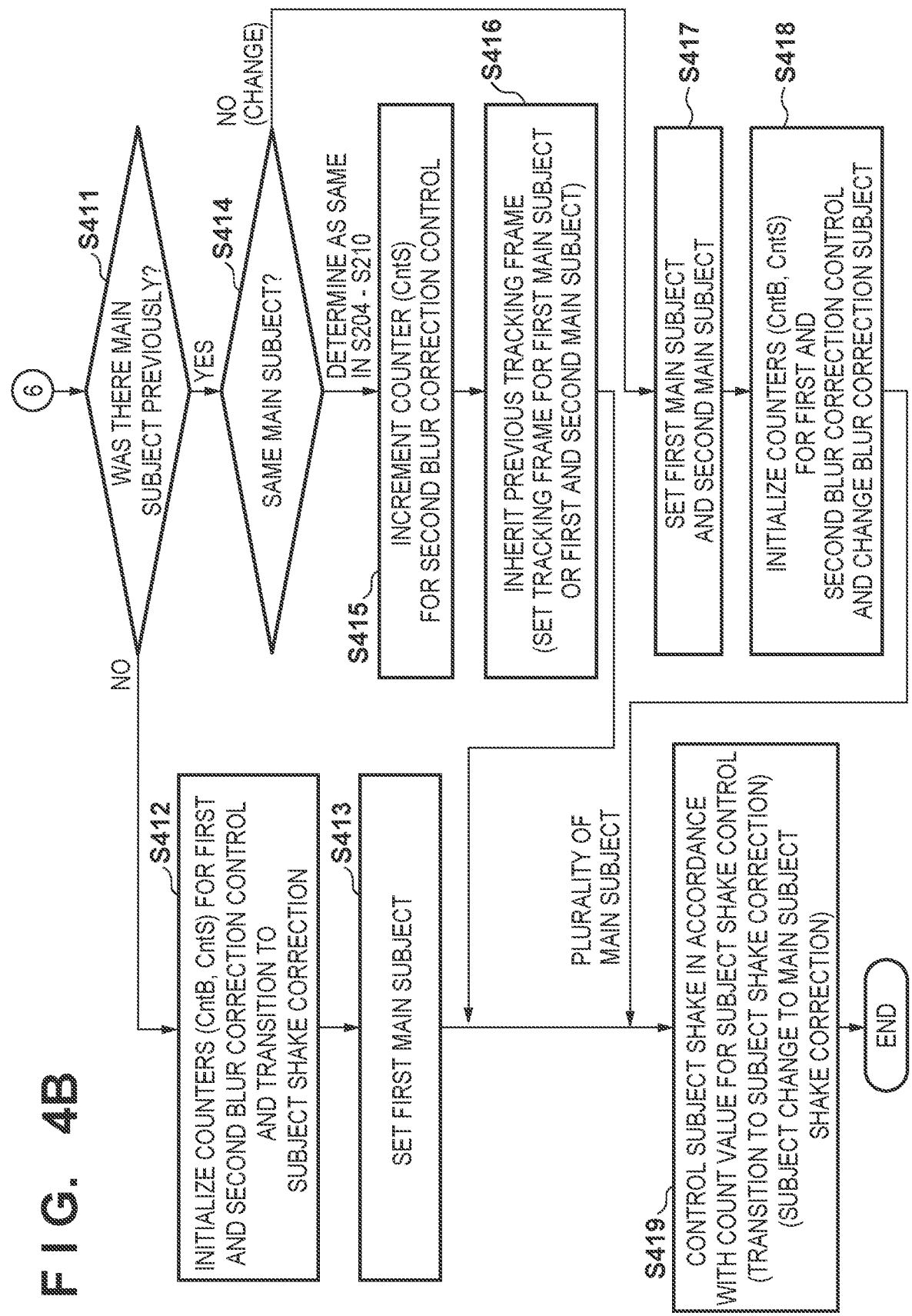

Here, the blur correction processing performed in step 306 is described below with reference to FIGS. 4A to 11. FIGS. 4A and 4B are flowcharts illustrating the procedure of the blur correction processing.

In step S401, information relating to the main subject detection obtained by the main subject detection circuit 26 is obtained.

In step S402, it is determined whether or not the main subject is detected, and if it is detected, the processing advances to step S411. In a case where the main subject region is determined in step S213 in FIG. 2B, the appropriate position of the central portion is set as that region. For this reason, since it can be determined that there is no clear main subject, it is determined that a main subject is not detected, and the processing advances to step S403. In a case where the main subject region is determined by other conditions in FIGS. 2A and 2B (steps S202, S204, S206, S208, S210, and S212), it is determined that the main subject is detected, the processing advances to step S411.

The processing of steps S403 to S407 is processing for correcting image blur due to subject shake or the like in a scene such as when a main subject cannot be detected such as a landscape or when the main subject is intentionally removed from the screen.

Firstly, in step S403, the tracking frame for detecting subject shake is set. Since the main subject is not detected here, a frame of the size set in step S213 of FIG. 2B is set at the central portion of the screen.

In step S404, it is checked whether or not the main subject has been detected in the previous imaging frame. For example, in the case where imaging is performed at 30 frames per second, determination is performed based on an image obtained in a frame every 1/30 of a second prior and the result of processing, by the procedure of FIGS. 2A and 2B, of the information obtained from the operation of the photographer, and the like.

In a case where the main subject has been detected in the previous imaging frame, the processing advances to step S405 and initializes values of a counter (CntB) for the first blur correction control and a counter (CntS) for the second blur correction control to zero.

In step S406, tracking frame information set for the main subject detected in the previous frame is obtained and recorded. The tracking frame information includes the size of the set frame, the center coordinates on the screen, and the moving direction and the movement amount of the frame on the screen.

As reasons why the main subject does not exist, there are cases where the main subject disappears from the screen, such as going out of frame, but there may be cases where a person or the like faces backward and no face is detected, and there are also cases where the main subject is determined to be a different subject because of clothes of different color patterns depending on the orientation. In this case, since there is a possibility that a main subject exists at a position on the screen detected in the previous frame, it is necessary to gradually change the amount of shake of the subject to reduce the discomfort in the recorded video. Therefore, the tracking frame information is obtained, and the amount of shake of the subject in the region is detected so that it is reflected in the final image stabilization correction amount. Thereafter, the processing advances to step S407.

In step S407, the blur correction control according to the counter value for the first blur correction is performed. Note that the following relates to this processing.

When it is determined in step S404 that the main subject is not detected in the previous imaging frame, the processing advances to step S408, and the value of the counter (CntB) for the first blur correction control is incremented, and then the processing advances to step S407.

On the other hand, if it is determined in step S402 that the main subject has been detected, the processing of step S411 and subsequent steps is performed. The processing of steps S411 to S419 is processing, in a case where the main subject is newly detected, for correcting image blur due to subject shake or the like in a scene where the main subject changes.

Firstly, in step S411, it is checked whether or not the main subject has been detected in the previous imaging frame. In a case where it has not been detected, the processing advances to step S412, and if it was detected, the processing advances to step S414.

In step S412, the values of the counter (CntS) for the second blur correction control and the counter (CntB) for the first blur correction control are initialized to zero. Thereafter, in step S413, a newly detected main subject is set as the first main subject, and the size of the main subject and the center coordinates on the screen, and the moving direction and movement amount on the screen for setting the tracking frame on the screen are obtained and recorded. Thereafter, the processing advances to step S419.

In step S414, it is determined whether the main subject detected in the current frame and the main subject detected in the previous frame are the same. This is performed using the function of the main subject detection circuit 26. As described above, the main subject detection circuit 26 has a function of estimating and tracking whether the detected subject is the same from the AF information of the adjacent AF points, the face detection result, the person detection result, the position and the motion vector of the detected moving body region, and the similarity of the color and brightness of the detected subject. Using this function, it is determined whether or not the main subjects are the same.

In a case where it is determined that they are the same, the processing advances to step S415, and the value of the counter (CntS) for the second blur correction control is incremented. Thereafter, in step S416, in order to inherit the main subject information used in the previous frame and set the tracking frame, the tracking frame information set in the previous frame is obtained and recorded. The tracking frame information includes the size of the set frame, the center coordinates on the screen, and the moving direction and the movement amount of the frame on the screen. In a case where there is one main subject, the information of the tracking frame set for the first main subject set in step S413 is obtained and recorded. In a case where there are two main subjects, the information of the tracking frame set for the first main subject, and the information of the tracking frame set for the subject set as the newly detected second main subject are obtained and recorded. Thereafter, the processing advances to step S419. Note, the setting of the second main subject is performed in step S417.

In a case where it is determined that the subject is not the same subject in step S414, the processing advances to step S417, and the newly detected subject is set to the second main subject, and the subject that has been tracked so far is set to the first main subject. Then, in order to set the tracking frame on the screen, the size of the main subject, the center coordinates on the screen, the moving direction on the screen, and the movement amount are obtained and recorded.

In step S418, the values of the counter (CntS) for the second blur correction control and the counter (CntB) for the first blur correction control are initialized to zero. Thereafter, the processing advances to step S419.

In step S419, the blur correction control according to the counter value for the second blur correction control is performed.

Here, the blur correction control according to the counter value for the first blur correction performed in step S407 is described with reference to FIGS. 5A and 5B. This process is a process of transitioning from the control of the blur correction of the first main subject to the control of the blur correction of the second main subject positioned in the center of the screen via the blur correction control of the background (the third subject).

If the photographer does not perform tracking when the first main subject moves greatly in real space, such as when the photographer greatly moves the image capturing apparatus main body 1 to change the imaging target, the position on the screen is greatly changed, and the main subject estimated to be the same as the first main subject ceases to be detected. The control of FIGS. 5A and 5B are a process used in such a case.

First, in step S501, it is checked whether the transition to the blur correction control when there is no main subject has already completed. This is performed by checking whether the previous tracking frame position is set in the central portion without detecting the main subject, and whether the counter value (CntB) for the first blur correction control is equal to or greater than a predetermined value (TrCntB) indicating a period in which the first blur correction control is changed.

When the transition to the blur correction control when the main subject is already not present is completed, the processing advances to step S502, and the tracking frame (central frame) is set at a central portion of the screen using the size information of the main subject region recorded in step S403. This is the same as that set in the previous frame, but the position is a central portion in the image after a deformation and partial cut out of the image of the previous frame was performed for the blur correction control, and so may not coincide with the central portion of the imaging element 3.

In step S503, a motion vector detection in the central frame is performed. In step S504, clustering of motion vector detection is performed to separate the motion vectors of the main subject in the central frame from the motion vectors of the background, etc., and to detect the motion vectors of the main subject in the central frame. In some cases, such as a landscape, there is no specific main subject in the central frame, and even if clustering is performed, classification is impossible; however, even in such a case, the processing advances treating it as the main subject alone being present in the central frame.

In step S505, a correction ratio of tracking frame 1, background frame, and central frame is obtained. In step S506, a rotational angle of the subject relative to the screen center is calculated. The amount of shake in the rotation direction of the image capturing apparatus main body 1 is detected by the shake detection sensor 14, and an image rotation angle for correcting the rotation blur from the detected value is obtained using the frame rate of the moving image capture.

In step S507, a blur correction amount is calculated. This is done by using motion vectors clustered in step S504, etc. and the correction ratio obtained in step S505.

In step S508, by using the image deformation clipping circuit 28, the rotation blur component is corrected by geometric deformation using the corrected rotational angle obtained in step S506, and the image is cut out so that the main subject position becomes a predetermined position from the blur correction amount obtained in step S507. An image blur correction that corrects the blurs caused by the horizontal and vertical movements is generated.

However, since the size of the cut-out image is set, when the cut-out range ceases to fulfill the predetermined size when the main subject position is set to the predetermined position, the cut-out range is set to the predetermined size and the main subject position is not set to the predetermined position.

On the other hand, when the transition to the blur correction control is in progress when a main subject is not present, the processing advances from step S501 to step S511 to check whether the counter value (CntB) for the first blur correction control is the initial value (=0). The processing advances to step S512 if the initial value is set, and to step S521 if the initial value is not set.

In step S512, the tracking frame 1 is set based on the tracking frame information of the previous frame recorded in step S406 of FIG. 4A.

In step S513, a motion vector detection in the tracking frame is performed. In step S514, clustering of motion vector detection is performed to separate the motion vectors of the main subject in the tracking frame 1 from the motion vectors of the background, etc., and to detect the motion vectors of the main subject in the tracking frame 1. Although the position of the tracking frame differs, the operation of step S513 is the same as the operation of step S503, and the operation of step S514 is the same as the operation of step S504.

A background frame is set in step S515. This is a region excluding the set tracking frame and central frame, and is divided into a plurality of regions of an appropriate size when motion vector detection is performed.

A motion vector detection in the background frame is performed in step S516. In step S517, clustering of motion vector detection is performed, and the background vector in the background frame is separated from the motion vector of the main subject, etc., and the motion vector of the background in the background frame, that is, the camera shake component is detected. Although the region to be detected differs, the operation of step S516 is the same as the operation of step S503, and the operation of step S517 is the same as the operation of step S504.

Thereafter, the process of steps S505 to S508 is performed.

Meanwhile, when the counter value (CntB) for the first blur correction control is not the initial value (=0) in step S511, it is checked in step S521 whether or not the counter value is equal to or less than one half of the predetermined value TrCntB indicating the period during which the first blur correction control is transitioned to. If it is less than ½, the process advances from step S521 to S513, and after that, the process after step S513 is performed using the information of the tracking frame 1 set in step S512.

In step S521, when the counter value (CntB) for the first blur correction control exceeds one half of the predetermined value TrCntB, the process of steps S522 to S524 is performed. This process is the same as steps S502 to S504.

In step S525, it is checked whether or not the counter value (CntB) for the first blur correction control is equal to or larger than a predetermined value TrCntB, that is, whether or not the transition period of the blur correction control is completed. If the counter value (CntB) is equal to or larger than the predetermined value TrCntB, it is determined that the transition period has ended, and the process advances to step S505 and performs steps S505 to S508. If the transition period has not been completed, the processing advances to step S515, and the processes for steps S515 to S517 and steps S505 to S508 are performed.

Next, the procedure for the processes of steps S502 to S508 is described with reference to FIG. 6.

Figure 6:
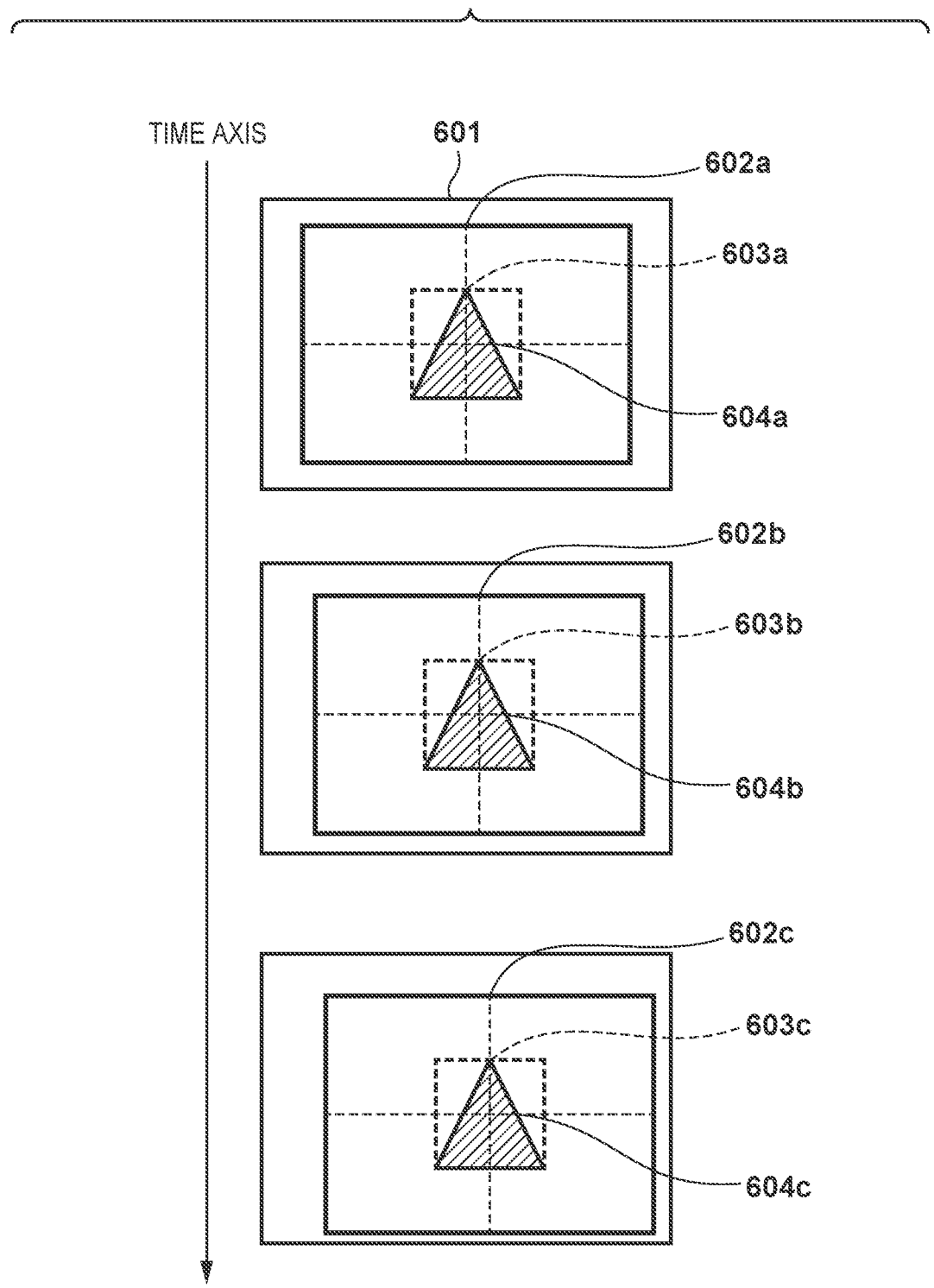
FIG. 6 is a view for describing a blur correction control for a subject in a central frame in the first embodiment.

Reference numeral 601 in FIG. 6 indicates the entire region of the image supplied from the VRAM 6 to the respective processing circuits, and reference numerals 602a, 602b, and 602c are portions of the image 601, and are images that correspond to the images displayed on the LCD in step S307 of FIG. 3A and corresponds to the image recorded in step S309. Reference numerals 603a, 603b, and 603c denote regions set as tracking frames for a first main subject, and reference numerals 604a, 604b, and 604c denote first main subjects.

When the tracking frame 603a is set two frames previous, the image of the region 602a is cut out from the image 601 after blur correction is performed. Then, in order to detect a motion vector in the next frame (previous frame), the region 603a is set as a tracking frame, and a region for which the motion vector search region is considered is recorded as a reference image. That region is something that adds a predetermined number of pixels in the horizontal direction and the vertical direction e.g., the number of pixels corresponding to 10% of the total image region as the motion vector search region) to the tracking frame.

In the previous frame, a tracking frame is set at the position of the region 603a, and a motion vector search calculation is performed between the image in the tracking frame and a recorded reference image, and thereby the movement amount of the subject on the screen caused by camera shake or movement of the subject is calculated. As a result, since it is detected that the subject has moved from the position indicated by reference numeral 604a to the position indicated by reference numeral 604b, the blur corrected image is generated by cutting out the image of the region 602b after the blur correction has been performed from the image 601.

Also, in order to detect a motion vector in the next frame (current frame), the region 603b is set as the tracking frame, and a region for which the motion vector search region is considered is recorded as a reference image.

Similarly, in the current frame, a tracking frame is set at the position of the region 603b, and a motion vector search calculation is performed between the image in the tracking frame and the recorded reference image, and thereby the movement amount of the subject on the screen caused by camera shake or movement of the subject is calculated. As a result, since it is detected that the subject has moved from the position indicated by the reference numeral 604b to the position indicated by the reference numeral 604c, the blur corrected image is generated by cutting out the image of the region 602b after the blur correction has been performed from the image 601.

The procedure from step S511 is described with reference to FIG. 7.

Figure 7:
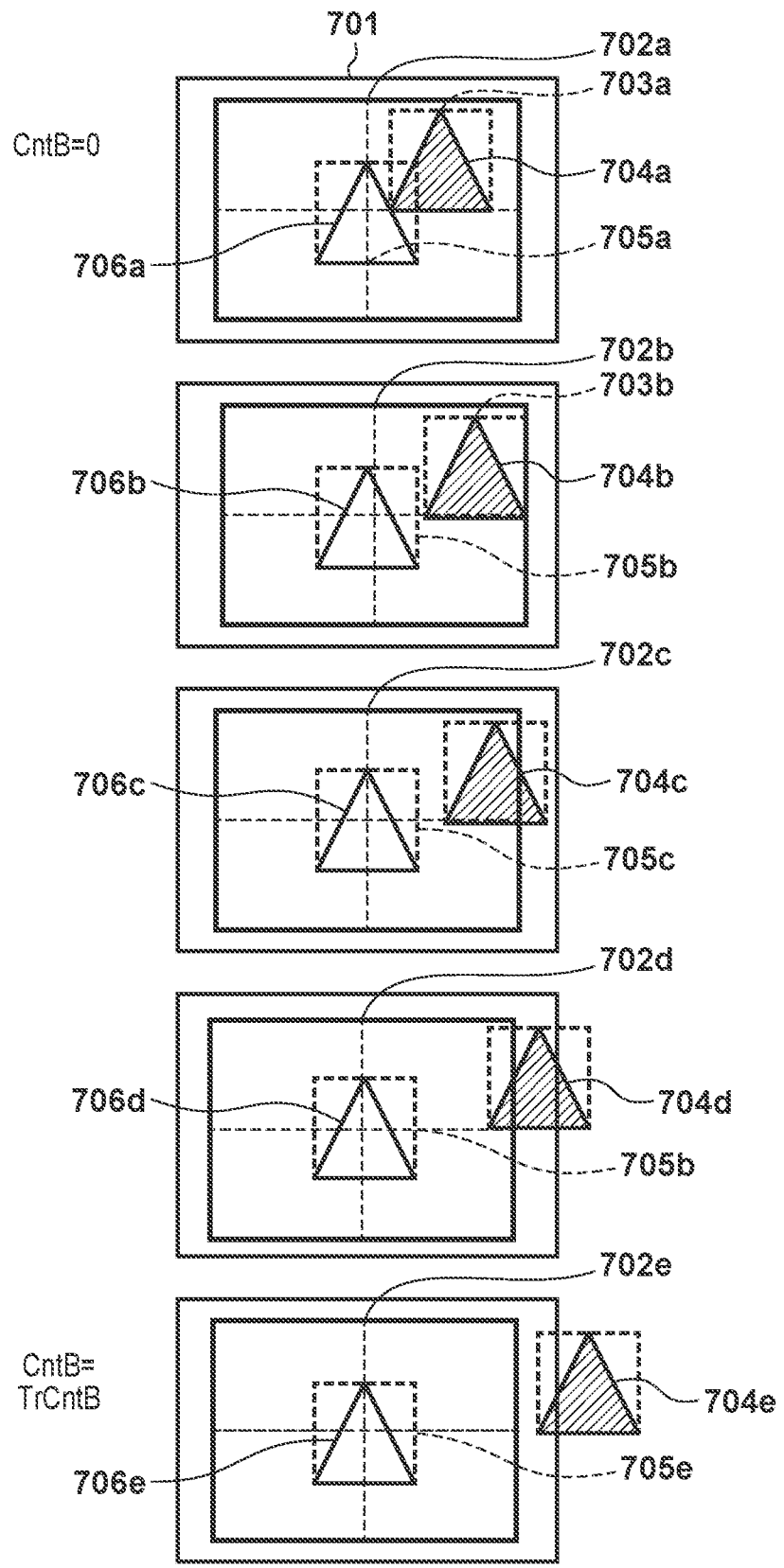
FIG. 7 is a view for describing a blur correction control for a first main subject, a background, and a subject in the central frame in the first embodiment.

Reference numeral 701 in FIG. 7 indicates the entire region of the image supplied from the VRAM 6 to the respective processing circuits, and reference numerals 702A to 702E are portions of the image 701 and are images that correspond to the images displayed on the LCD in step S307 of FIG. 3A and corresponds to the image recorded in step S309. Reference numerals 703a and 703b denote regions set as tracking frames for a first main subject, reference numerals 704a to 704e denote first main subjects, reference numerals 705a to 705e denote regions set as tracking frames for a second main subject, and reference numerals 706a to 706e denote second main subjects.

At the time of starting the transition (CntB=0), the tracking frame 703a of the first main subject is set as the tracking frame 1. Then, a region in which the motion vector search region is considered in the tracking frame 703a which is the tracking frame 1 is recorded as a reference image in order to detect motion vectors in the following frames. The region is something that adds a predetermined number of pixels in the horizontal direction and the vertical direction e.g., the number of pixels corresponding to 10% of the total image region as the motion vector search region) to the tracking frame 1.

At the same time, the tracking frame 705a of the second main subject is set as the central frame. Then, in order to detect a motion vector in the following frames, a region, in which the motion vector search region is considered, is recorded as a reference image in the central frame 705a.

The image 701 is recorded as a reference region for detecting a motion vector of the background. At this point in time, it is determined that the first main subject exists in the region 704a based on the motion vector detection result of the tracking frame 1, and blur correction control is performed by cutting out the image of the blur corrected region 702a from the image 701.

In the next frame, the tracking frame is set at the position of the region 703a, and a motion vector search calculation is performed between the image in the tracking frame and the recorded reference image, thereby the movement amount of the first main subject on the screen caused by camera shake or movement of the subject is calculated. As a result, it is detected that the first main subject in the tracking frame 1 has moved from the position indicated by the reference numeral 704a to the position indicated by the reference numeral 704b. Therefore, in order to detect motion vectors in the following frames, the region 703b is set as the tracking frame 1, and the region, in which the motion vector search region is considered, is recorded as a reference image.

Simultaneously, the central frame is set at the position of the region 705a, and a motion vector search calculation is performed between the image in the central frame and the recorded reference image, and thereby the movement amount of the second main subject at the central frame position on the screen caused by camera shake or movement of the subject is calculated. Also, in order to detect motion vectors in the following frames, the region 706b is set as the central frame, and the region, in which the motion vector search region is considered, is recorded as a reference image.

Further, by performing a motion vector search calculation with respect to the reference image recorded in the background frame, the movement amount on the screen of the background caused by the camera shake is calculated. Similarly to when the transition is started, the image 701 is recorded as a reference region. During a period of CntB≤TrCntB/2 from this frame, blur correction control is performed based on the movement amount of the subject detected in the tracking frame 1 and the movement amount of the background detected in the background frame.

As a result of determining the clipping region by adding the movement amounts of the two at a desired ratio, the image of the region 702b is clipped to generate an image subjected to blur correction.

From the next frame onward, in a period of CntB<TrCntB/2, the tracking frame 1 is similarly set at the position of the region 703b, and the movement amount of the first main subject on the screen is calculated. Further, a central frame is set at the position of the region 706b, and the movement amount on the screen of the second main subject of the central frame position is calculated. In accordance with the calculated movement amount, the tracking frame 1 and the central frame are set and the reference image is recorded. In addition, the movement amount on the screen of the background is calculated within the background frame, and the image 701 is recorded as a reference region.

At the transition midpoint (CntB=TrCntB/2), the movement amount on the background screen is calculated using the background frame set in the immediately preceding frame. The blur correction control is performed so as to cancel the movement amount of the background corresponding to the camera shake obtained as the result of this, and the image of the blur corrected region 702c is cut out from the image 701.

Then, as a result of calculating the movement amount of the second main subject at the central frame position on the screen, it is detected that the subject in the central frame has moved to the region 705c. Therefore, in order to detect the motion vectors in the following frames, the region 706c is set as the central frame, and the region in which the motion vector search region is considered is recorded as a reference image.

In the next frame, the central frame is set at the position of the region 705c, and a motion vector search calculation is performed between the image in the central frame and the recorded reference image, thereby the movement amount of the second main subject at the central frame position on the screen caused by camera shake or movement of the subject is calculated. Then, in order to detect a motion vector in the following frames, the region 705d is set as the central frame, and the region in which the motion vector search region is considered is recorded as a reference image.

Further, by performing a motion vector search calculation with respect to the reference image recorded in the background frame, the movement amount on the screen of the background caused by the camera shake is calculated and the image 701 is recorded as the reference region. Then, the blur correction control is performed based on the movement amount of the background detected by the movement amount and the background frame of the subject detected by the central frame.

As a result of determining the clipping region by adding the movement amounts of the two at a desired ratio, the image of region 702d is clipped to generate an image subjected to blur correction.

In the subsequent CntB<TrCntB periods, similarly, the central frame is set at the position of the region 705d, the movement amount on the screen of the second main subject at the central frame position and the movement amount on the screen of the background caused by the camera shake are calculated, and the blur correction control is performed based on the movement amounts of both. The central frame of the next frame is set and the reference image is recorded.

At the end of the transition of CntB=TrCntB, the central frame is set, and blur correction control is performed by calculating the movement amount on the screen of the second main subject of the central frame position. That is, since it is detected that the subject of the central frame has moved to the position indicated by reference numeral 706e, blur correction control is performed by culling out a region 702e.

Here, an operation procedure for clustering performed in step S504 and the like is described with reference to FIG. 8A and FIG. 8B.

By performing motion vector detection, cluster value setting, separation of motion vectors, and separation result determination, separation of motion vectors is performed when there are a plurality of subjects with different movements such as a main subject vector and a background vector.

Figure 8A:
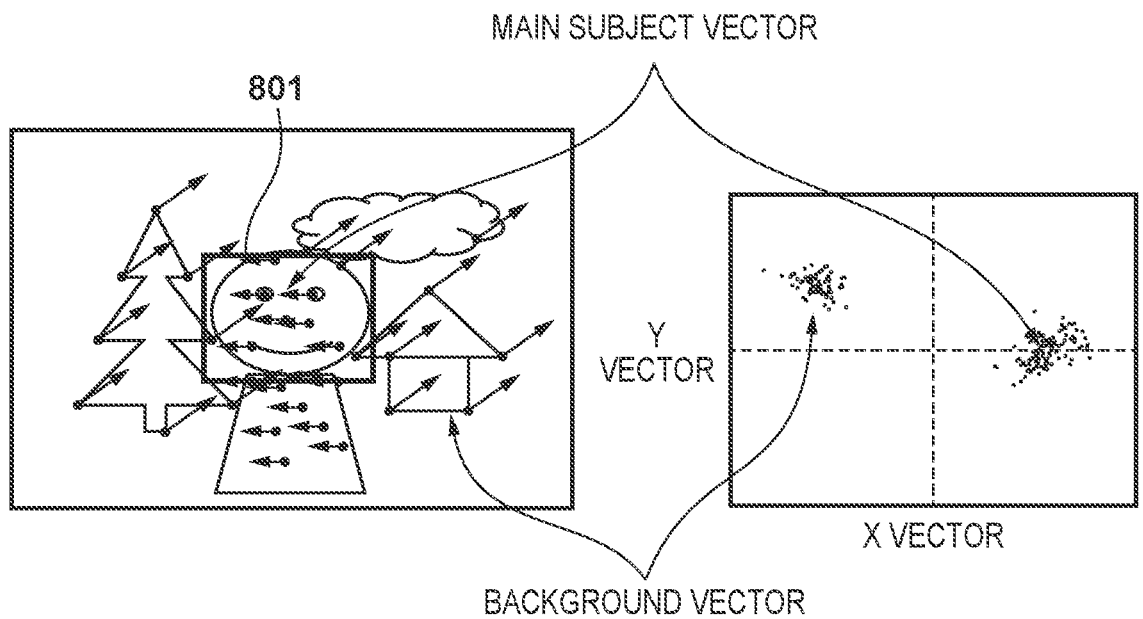
FIGS. 8A and 8B are views for describing a clustering operation in the first embodiment.
Figure 8B:
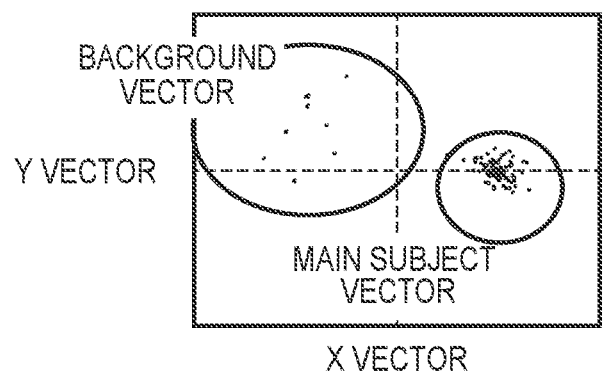

A frame illustrated by a dashed line in FIG. 8A is a tracking frame 801, and the main subject is present in the frame. The main subject moves as shown by the arrows in the figure, the background is also moving as shown by the arrows, each motion vector in the horizontal (X) direction and the vertical (Y) direction is detected. The detection results are shown on the right-hand graph of FIG. 8A, where the motion vectors in the Y direction are on the vertical axis, and the motion vectors in the X direction are on the horizontal axis. The motion vectors of the main subject are caused by the motion of the subject itself and intentional panning of the photographer who follows it, and the motion vectors of the background are mainly caused by the camera shake. Thus, there is a clear difference between the two as shown in the graph. Since the main subject is moving in the +horizontal direction (left direction), the X motion vectors are distributed in the +region, and the Y motion vectors are distributed near zero. Since the background is moving diagonally upwards opposite to the main subject, the X motion vectors are distributed in the −region, and the Y motion vectors are distributed in the +region.

Therefore, cluster values are set, and both are separated from each other. First, the mean value (XmeanAll) of all X motion vectors and the mean value (YmeanAll) of all Y motion vectors are obtained, and the detected motion vectors are separated using the obtained mean values as the cluster initial values. The motion vectors shown in the graphs of the FIG. 8A are separated into four regions by the obtained two mean values.

An example from FIG. 8A, when the motion vectors existing in the regions divided by the dashed lines of the graph are checked, there are motion vector of the background in the upper left region, and there are motion vectors of the main subject in the right region. When two motion vectors exist in the screen as described above, they can be separated; however, when the inside of the tracking frame is evaluated as illustrated in FIG. 8B, only the motion vectors corresponding to the movement of the subject exist, so that separation cannot be performed.

Thus, assuming a distribution range (XΔ·YΔ) for the same motion vector considering detection error, it is determined that only a single motion vector is present in the tracking frame if the number of motion vectors present in XmeanAll±XΔ and YmeanAll±YΔ is more than a predetermined ratio (e.g., 80%).

In this case, the standard deviation (XσAll) of all X motion vectors and the standard deviation (YσAll) of all Y motion vectors are obtained, and if both the two values are equal to or less than a predetermined value (for example, XσAll≤2·XΔ and YσAll≤2·YΔ), it is determined that a motion vector in the tracking frame can be obtained. Then, the motion vectors within the scopes of XmeanAll±XσAll and YmeanAll±YσAll are extracted, and the mean value (XmeanAllp) of the X motion vectors and the mean value (YmeanAllp) of the Y motion vectors are used as the motion vector within the tracking frame.

When it is determined that separation is possible, the appropriateness of the separation of the motion vectors is determined by evaluating the number and distribution range of the motion vectors of each region.

The mean values (Xmean[n], Ymean[n]) of the X motion vectors and the Y motion vectors existing in each region are obtained. Then, a region in which the number of motion vectors existing in Xmean[n]±XΔ and Ymean[n]YΔ among the motion vectors existing in the respective regions is equal to or more than a predetermined amount (e.g., 20% of all motion vectors) is determined to be a region in which a subject having a different motion exists.

In this case, the standard deviation (Xσ[n]) of all X motion vectors and the standard deviation (Yσ[n]) of all Y motion vectors are obtained. Then, if both of these two values are equal to or less than a predetermined value, (e.g., XσAll≤2·XΔ and YσAll≤2·YΔ), it is determined that a motion vector of the region in the tracking frame can be obtained.

Then, in the obtainable region, the motion vectors within the scope of Xmean[n]±Xσ[n] and Ymean[n]±Yσ[n] are extracted, and the mean value (Xmean[n]p) of the X motion vectors and the mean value (Ymean[n]p) of the Y motion vectors are used as the motion vector within the tracking frame. A plurality of motion vectors may be obtained.

When motion vectors can be obtained in a plurality of regions within the tracking frame, Xmean[n]p and Ymean[n]p are selected where the number of detected motion vectors is the largest. However, if the number of extracted motion vectors is less than a predetermined value, it is determined that the motion vector detection is impossible, the motion vector value is set to zero, and it is assumed that there is no subject with movement within the detected tracking frame.

Figure 5A:
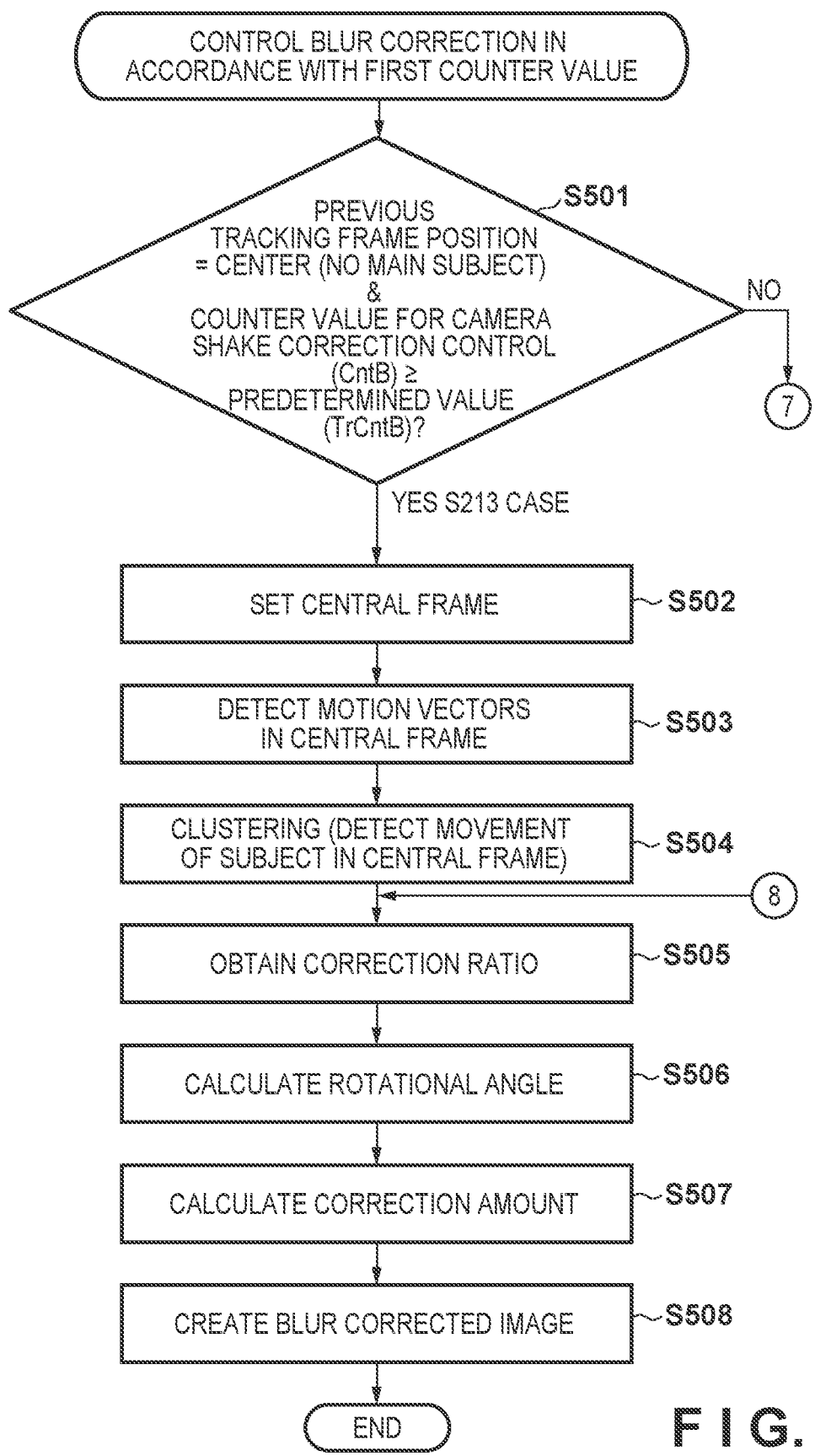
FIGS. 5A and 5B are flowcharts of a blur correction control according to a first counter value in the first embodiment.
Figure 5B:
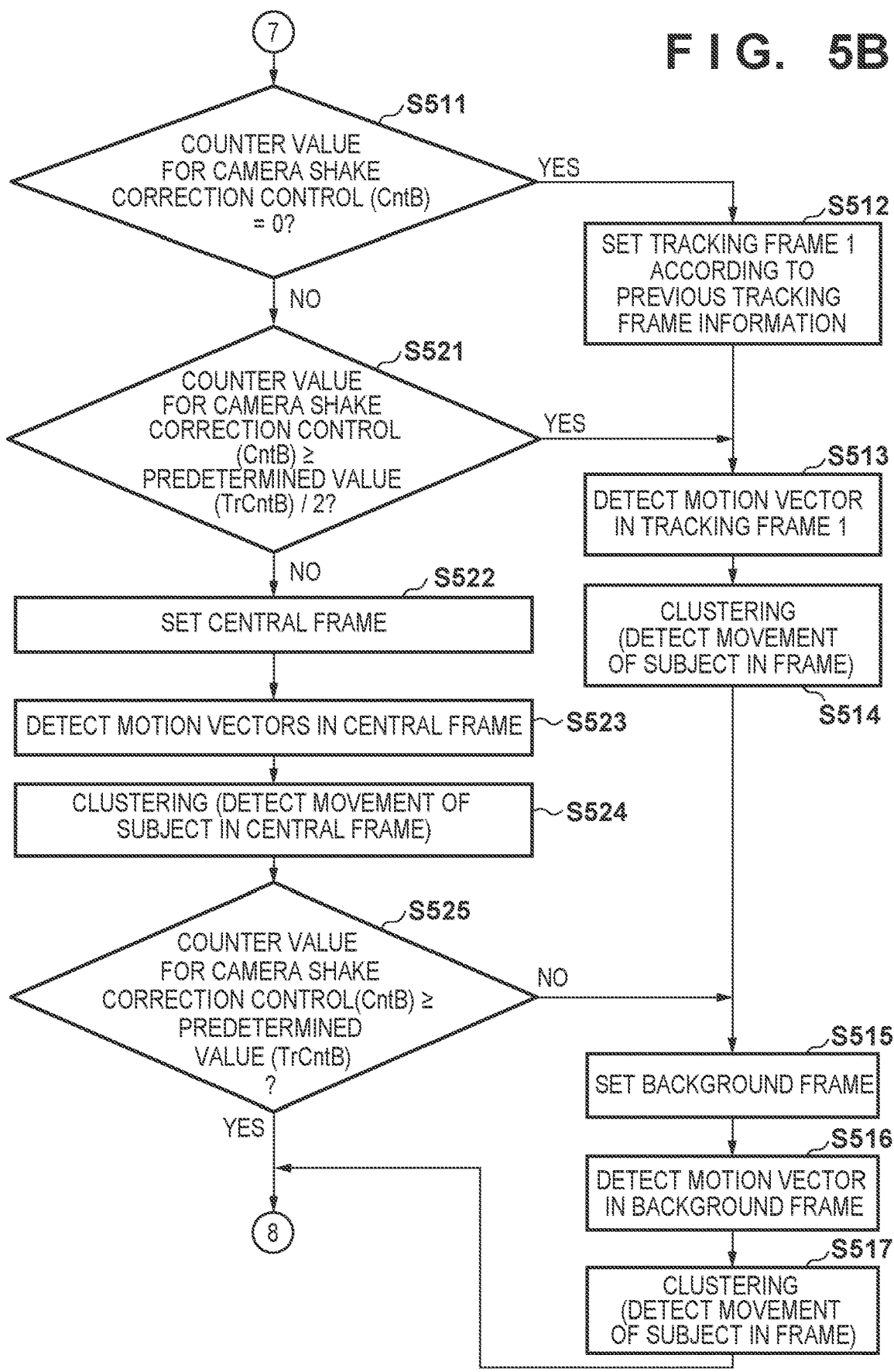

Here, the process of step S505 in FIG. 5A and step S905 in FIG. 9A is described.

In this step, the processing of calculating the correction ratio α1 for the region (first main subject) before the transition of the blur correction control target subject region, the correction ratio α2 for the background, and the correction ratio α3 for the region (central region or second main subject) after the transition of the blur correction control target subject region is performed.

The motion vector in the tracking frame 1 obtained by clustering is defined as Xmean1p, Ymean1p, the motion vector in the central frame (or the tracking frame 2) is defined as XmeanCp, YmeanCp, and the motion vector in the background frame is defined as XmeanBp, YmeanBp. In this case, the correction amounts Xis and Yis in the horizontal and vertical directions using the correction amount ratios α1, α2, and α3 of the tracking frame 1, the central frame (or the tracking frame 2), and the background frame are as follows.

For $CntB \leq TrCntB/2$ (or $CntS \leq TrCntS/2$)

$Xis = \alpha1 \cdot Xmean1p + \alpha3 \cdot XmeanBp$ $Yis = \alpha1 \cdot Ymean1p + \alpha3 \cdot YmeanBp$ For $CntB > TrCntB/2$ (or for $CntS > TrCntS/2$)

$Xis = \alpha2 \cdot XmeanC + \alpha3 \cdot XmeanBp$ $Yis = \alpha2 \cdot YmeanC + \alpha3 \cdot YmeanBp$ Therefore, in a case of obtaining the ratio of the correction amount of the tracking frame 1, the central frame, and the background frame in accordance with the progress of the transition of the main subject region for performing the blur correction, the following equations are used.

$\alpha1 = (TrCntB - 2 \cdot CntB)/TrCntB$ $\alpha2 = (2 \cdot CntB - TrCntB)/TrCntB$ $\alpha3 = (1-\alpha1)$ for $CntB \leq TrCntB/2$ $\alpha3 = (1-\alpha2)$ for $CntB > TrCntB/2$ Similarly, when the ratio of the correction amounts of the tracking frame 1 the tracking frame 2, and the background frame is obtained, the following equations are used.

$\alpha1 = (TrCntS - 2 \cdot CntS)/TrCntS$ $\alpha2 = (2 \cdot CntS - TrCntS)/TrCntS$ $\alpha3 = (1-\alpha1)$ for $CntS \leq TrCntS/2$ $\alpha3 = (1-\alpha2)$ for $CntS > TrCntS/2$ However, α1, α2, and α3 take values in the range of a maximum value of 1 and minimum value of 0, and when they exceed 1, the values are set to 1, and when they are less than 0, the values are set to 0.

Figure 9B:
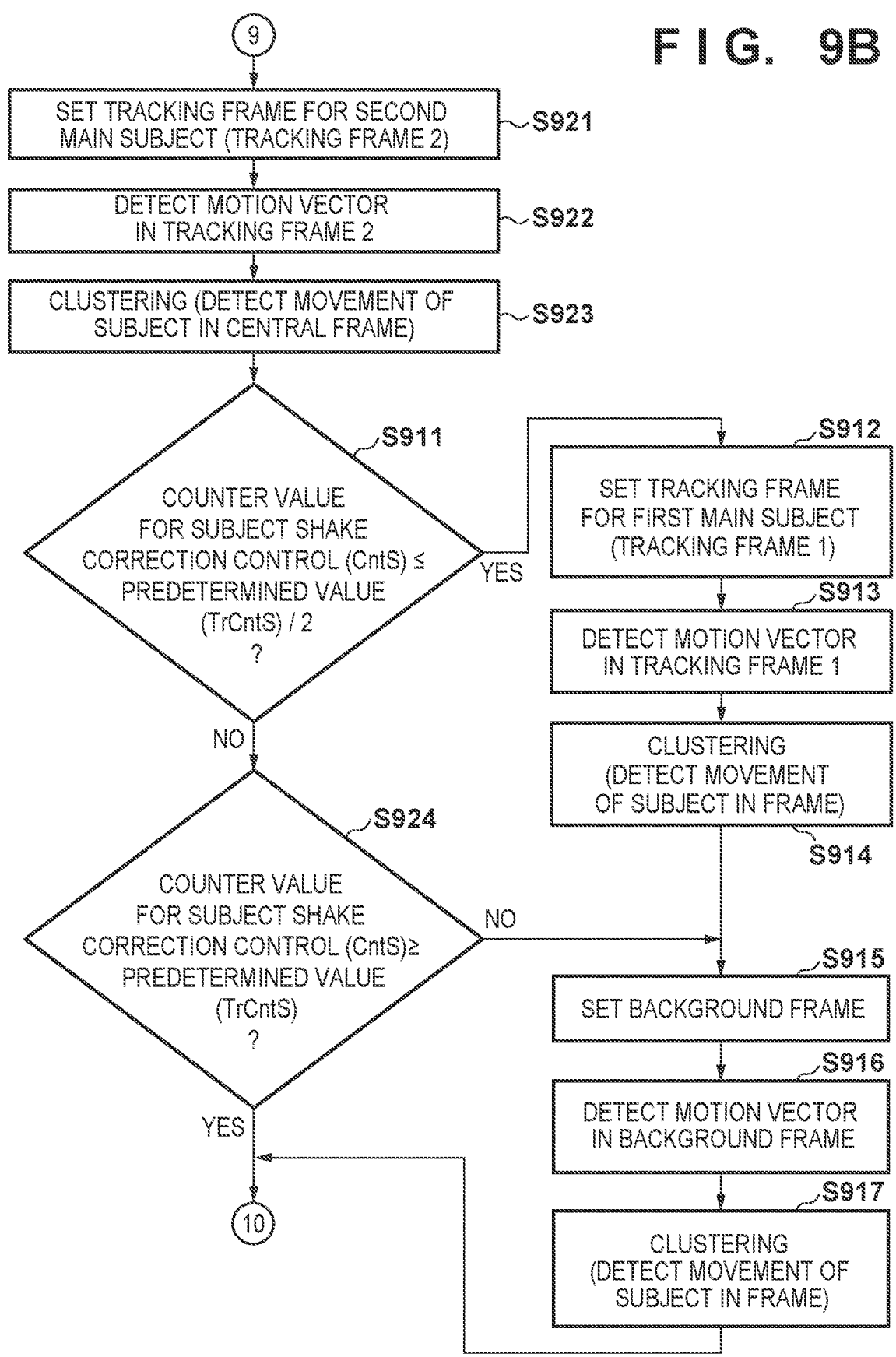

Here, the blur correction control according to the counter value for the second blur correction performed in step S419 is described with reference to FIGS. 9A and 9B.

This process is a process of transitioning from the control of the blur correction of the first main subject to the control of the blur correction of the second main subject via the blur correction control of the background (the third subject).

This processing is used in a case where a main subject estimated to be the same as the first main subject ceases to be detected and it is determined that a new main subject (second main subject) is detected, in a case where the photographer does not perform tracking when the first main subject moves greatly in real space, such as when the photographer greatly moves the image capturing apparatus main body 1 to change the imaging target.

First, in step S901, it is checked whether the transition to the blur correction control due to a change of the main subject has already completed. This is performed by checking whether a subject recognized as the main subject was detected when the change process ended, and whether the counter value (CntS) for the second blur correction control is equal to or greater than a predetermined value (TrCntS) indicating a period in which the second blur correction control is changed.

In a case where the blur correction control transition due to the chance of the main subject has already completed, the processing advances to step S902, and the size information of the main subject region recorded in step S417 and inherited in step S416 is used to set tracking frame 1 of the first main subject (the main subject when the change processing ends). This is set at a predetermined position of the image supplied from the VRAM 6 to the respective processing circuits based on the information of the main subject detection circuit 26, and therefore is not necessarily the same as that set in the previous frame.

In step S903, motion vector detection in the tracking frame 1 is performed. In step S904, clustering of motion vector detection is performed to separate the motion vectors of the main subject in the tracking frame 1 from the motion vectors of the background, etc., and to detect the motion vectors of the main subject in the tracking frame 1.

After this, in step S905, a correction ratio of the tracking frame 1, the tracking frame 2, and the background frame is obtained. This processing is the same as the processing in step S505 of FIG. 5A.

The processing of steps S906 to S908 differs in the tracking frame to be processed, but is performed in a similar manner as in steps S506 to S508 of FIG. 5A. In step S906, a rotational angle of the subject relative to the center of the screen is calculated. In step S907, a correction amount is calculated by using the motion vectors clustered in step S904 and the like and the correction ratio obtained in step S905.

In step S908, the image deformation clipping circuit 28 is used to correct the rotation blur component by geometric deformation, and the image is cut out so that the main subject position becomes a predetermined position, thereby generating a blur corrected image obtained by correcting the blur caused by the movement in the horizontal and vertical directions.

In step S909, transition end processing is performed in a case where CntS=TrCntS. Since the process to change the main subject has ended, the tracking frame information of the main subject (first main subject) prior to the change is deleted, the main subject after the change (second main subject) is set as the first main subject, and the tracking frame information is re-recorded as the tracking information of the first main subject.

In addition, in a case where the change to the blur correction control due to the transfer of the main subject is in progress, the processing advances from step S901 to step S921. Then, the tracking frame 2 is set based on information such as the size and the center coordinates of the second main subject that has been recognized as the main subject in the current frame detected by the main subject detection circuit 26.

In step S922, a motion vector detection in the tracking frame 2 is performed. In step S923, clustering of motion vector detection is performed to separate the motion vector of the main subject in the tracking frame 2 from the motion vector of the background, etc., and to detect the motion vector of the main subject in the tracking frame 2. Although the position of the tracking frame differs, the operation of step S922 is the same as the operation of step S503 of FIG. 5A, and the operation of step S923 is similar to the operation of step S504 of FIG. 5A.

In step S911, it is checked whether or not the counter value (CntS) for the second blur correction control is equal to or less than ½ of a predetermined value TrCntS indicating a period in which the second blur correction control is changed. If it is less than ½, the processing advances to step S912, and if it is more than ½, the processing advances to step S924.

In step S912, the tracking frame 1 is set based on information such as the size and the center coordinates of the first main subject that has been recognized as the main subject in the previous frame detected by the main subject detection circuit 26.

In step S913, a motion vector detection in the tracking frame 1 is performed. In step S914, clustering of motion vector detection is performed to separate the motion vectors of the main subject in the tracking frame 1 from the motion vectors of the background, etc., and to detect a motion vector of the main subject in the tracking frame 1. Although the position of the tracking frame differs, the operation of step S913 is the same as the operation of step S503 of FIG. 5A, and the operation of step S914 is the same as the operation of step S504 of FIG. 5A.

A background frame is set in step S915. This is a region excluding the set tracking frame 1 and tracking frame 2, and is divided into a plurality of regions of an appropriate size when motion vector detection is performed. The tracking frame 2 is set based on information such as the size and the center coordinates of the second main subject that has been recognized as the main subject in the current frame detected by the main subject detection circuit 26.

In step S916, a motion vector detection in the background frame is performed. In step S917, clustering of motion vector detection is performed, and the background vector in the background frame is separated from the motion vectors of the main subject, etc., and the motion vectors of the background in the background frame, that is, the camera shake component is detected. Although the regions to be detected differ, the operation of step S916 is similar to the operation of step S503 of FIG. 5A, and the operation of step S917 is similar to the operation of step S504 of FIG. 5A. Thereafter, the processing of steps S905 to S909 is performed.

On the other hand, when the counter value (CntS) for the second blur correction control exceeds ½ of the predetermined value TrCntS, the processing advances from step S911 to step S924.

In step S924, it is checked whether or not the counter value (CntS) for the second blur correction control is equal to or larger than a predetermined value TrCntS, that is, whether or not the transition period of the blur correction control is completed. If the counter value (CntS) is equal to or larger than the predetermined value TrCntS, it is determined that the transition period has ended, and the process advances to step S905 performs steps S905 to S909. If the transition period has not completed, the processing advances to step S915, and the processing of steps S915 to S917 and steps S905 to S909 are performed.

The procedure of steps S902 to S908 is described with reference to FIG. 10.

Figure 10:
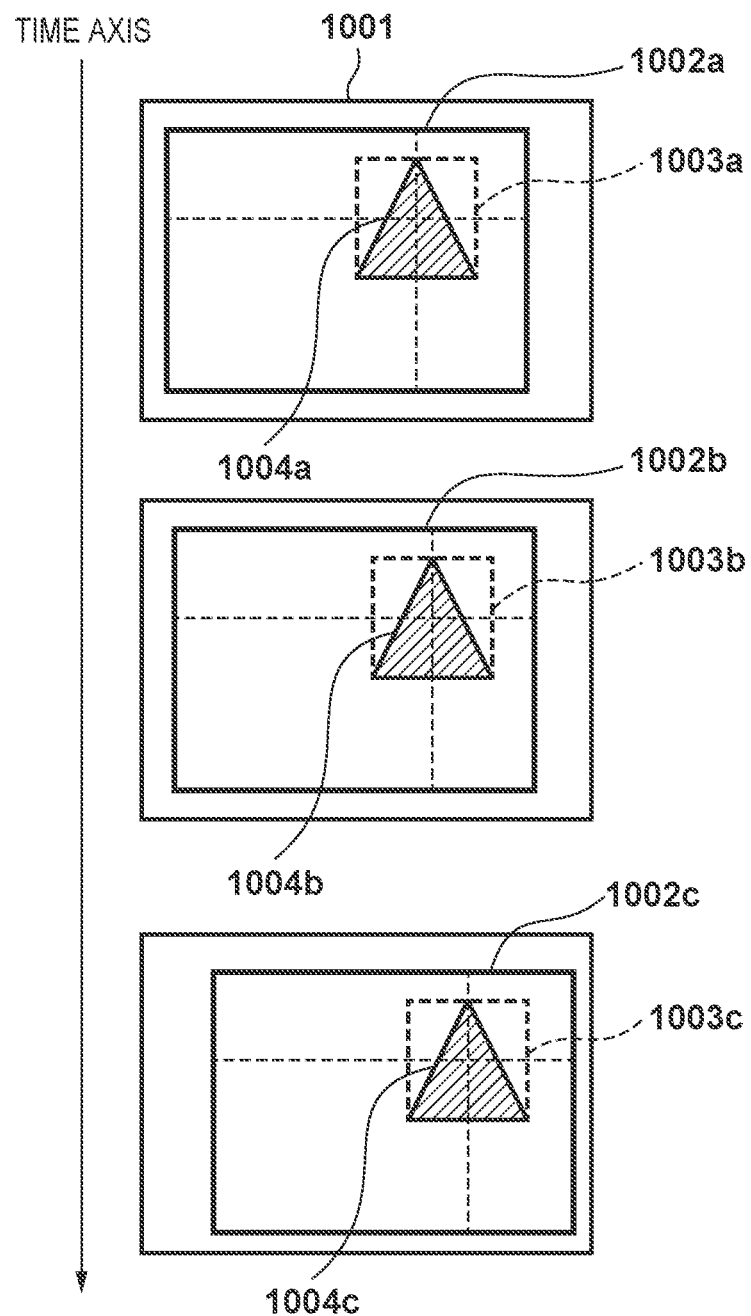
FIG. 10 is a view for describing a blur correction control for the first main subject in the first embodiment.

Reference numeral 1001 in FIG. 10 indicates the entire region of the image supplied from the VRAM 6 to the respective processing circuits, and reference numerals 1002a, 1002b, and 1002c are images which are portions of the image 1001, and are images that correspond to the images displayed on the LCD in step S307 of FIG. 3A and corresponds to the image recorded in step S309. Reference numerals 1003a, 1003b, and 1003c indicate regions set as tracking frames for the first main subject, and reference numerals 1004a, 1004b, and 1004c indicate first main subjects.

In a case where the tracking frame 1003a is set in the frame two previous, the image of the region 1002a is cut out after blur correction is performed from the image 1001. Then, in order to detect a motion vector in the next frame (previous frame), the region 1003a is set as a tracking frame, and a region in which the motion vector search region is considered is recorded as a reference image.

In the previous frame, a tracking frame is set at the position of the region 1003a, and a motion vector search calculation is performed between the image in the tracking frame and the recorded reference image, thereby the movement amount of the subject on the screen caused by camera shake or movement of the subject is calculated. As a result, since it is detected that the subject has moved from the position indicated by 1004a to the position indicated by 1004b, the blur corrected image is generated by cutting out the image of the region 1002b after the blur correction has been performed from the image 1001. Also, in order to detect motion vectors in the next frame (current frame), the region 1003b is set as a tracking frame, and a region in which the motion vector search region is considered is recorded as a reference image.

Similarly, in the current frame, a tracking frame is set at the position of the region 1003b, and a motion vector search calculation is performed between the image in the tracking frame and the recorded reference image, and thereby the movement amount of the subject on the screen caused by camera shake or movement of the subject is calculated. As a result, since it is detected that the subject has moved from the position indicated by 1004a to the position indicated by 1004b, the blur corrected image is generated by cutting out the image of the region 1002b after the blur correction has been performed from the image 1001.

The procedures after step S911 are described with reference to FIG. 11.

Figure 11:
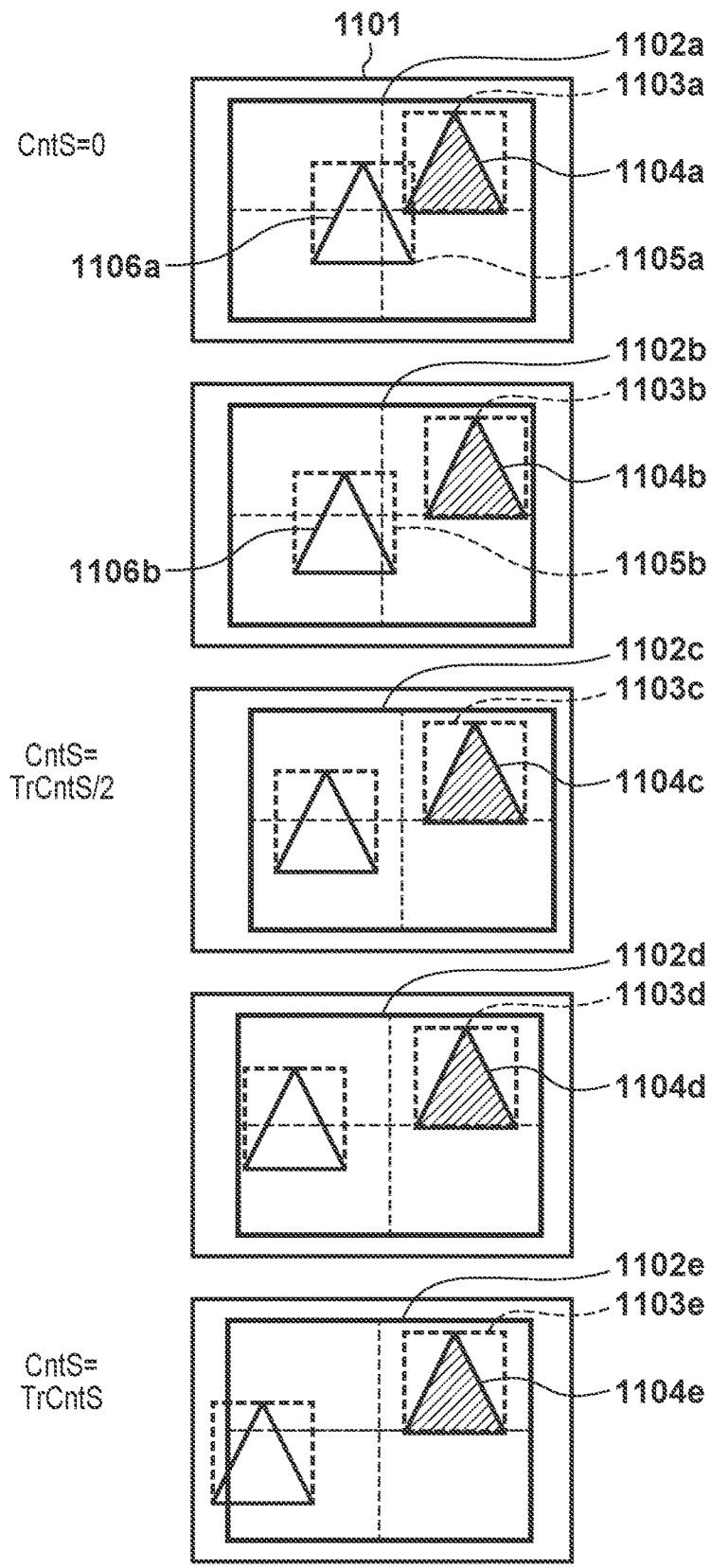
FIG. 11 is a view for describing a blur correction control for the first main subject, a background, and a second main subject in the first embodiment.

Reference numeral 1101 in FIG. 11 indicates the entire region of the image supplied from the VRAM 6 to the respective processing circuits, and reference numerals 1102a to 1102e are images which are portions of the image 1101, and are images that correspond to the images displayed on the LCD in step S307 of FIG. 3A and correspond to the image recorded in step S309. The reference numerals 1103a to 1103e denote regions (tracking frame 2) set as tracking frames for the second main subject to be subjected to the blur correction after the transition of the blur correction control is completed. The reference numerals 1104a to 1104e denote second main subjects. The reference numerals 1105a and 1105b denote a region (tracking frame 1) set as a tracking frame for the first main subject, and the reference numerals 1106a and 1106b denote the first main subject.

At the time of starting the transition (CntS=0), the tracking frame 1105a of the first main subject is set as the tracking frame 1. Then, in order to detect a motion vector in the following frames, a region, in which the motion vector search region is considered, is recorded as a reference image in the region 1105a which is the tracking frame 1.

At the same time, the tracking frame 1103a of the second main subject is set as the tracking frame 2. Then, in order to detect a motion vector in the following frames, a region, in which the motion vector search region is considered, is recorded as a reference image in the region 1105a which is the tracking frame 2. The image 1101 is recorded as a reference region for detecting a motion vector of the background.

At this point in time, it is determined that the subject exists at the position indicated by the reference numeral 1106a based on the motion vector detection result of the tracking frame 1, and blur correction control is performed by culling out the image of the blur corrected region 1102a from the image 1101.

In the next frame, the tracking frame 1 is set at the position of the region 1105a, and a motion vector search calculation is performed between the image in the tracking frame 1 and the recorded reference image, thereby the movement amount of the first main subject on the screen caused by camera shake or movement of the subject is calculated. As a result, it is detected that the first subject in the tracking frame 1 has moved from the position indicated by the reference numeral 1106a to the position indicated by the reference numeral 1106b. Therefore, in order to detect the motion vector in the following frames, the region 1105b is set as the tracking frame 1, and the region, in which the motion vector search region is considered, is recorded as a reference image.

Simultaneously, the tracking frame 2 is set at the position of the region 1103a, and a motion vector search calculation is performed between the image in the tracking frame 2 and the recorded reference image, and thereby the movement amount of the second subject on the screen caused by camera shake or movement of the subject is calculated. Then, in order to detect the motion vector in the following frames, the region 1103b is set as the tracking frame 2, and the region, in which the motion vector search region is considered, is recorded as a reference image.

Also, by performing a motion vector search calculation with respect to the reference image recorded in the background frame, the movement amount on the screen of the background caused by the camera shake is calculated. Similarly to when the transition is started, the image 1101 is recorded as a reference region.

During a period of CntS≤TrCntS/2 from this frame, blur correction control is performed based on the movement amount of the subject detected in the tracking frame 1 and the movement amount of the background detected in the background frame.

As a result of determining the clipping region by adding the movement amounts of the two at a desired ratio, the image which indicates the reference numeral 1102b is clipped to generate an image subjected to blur correction.

From the next frame onward, in a period of CntS<TrCntS/2, the tracking frame 1 is similarly set at the position of the region 1105b, and the movement amount of the first main subject on the screen is calculated. Further, the tracking frame 2 is set at the position of the region 1103b and the movement amount on the screen of the second main subject is calculated. Also, in accordance with the calculated movement amount, the tracking frame 1 and the tracking frame 2 are set and the reference image is recorded. In addition, the movement amount on the screen of the background is calculated within the background frame, and the image 1101 is recorded as a reference region.

At the transition midpoint (CntS=TrCntS/2), the movement amount on the background screen is calculated using the background frame set in the immediately preceding frame. The blur correction control is performed so as to cancel the movement amount of the background corresponding to the camera shake obtained as a result, and the image of the blur corrected region 1102c is cut out from the image 1101.

As a result of calculating the movement amount of the second main subject on the screen, it is detected that the second main subject in the tracking frame 2 has moved to the position indicated by the reference numeral 1104c. Therefore, in order to detect the motion vector in the following frames, the region 1105b is set as the tracking frame 2, and the region 1103, in which the motion vector search region is considered, is recorded as a reference image.

In the next frame, the tracking frame 2 is set at the position of the region 1103, and a motion vector search calculation is performed between the image in the tracking frame 2 and the recorded reference image, thereby the movement amount of the second main subject on the screen caused by camera shake or movement of the subject is calculated. Then, in order to detect the motion vector in the following frames, the region 1103b is set as the tracking frame 2, and the region, in which the motion vector search region is considered, is recorded as a reference image.

Further, by performing a motion vector search calculation with respect to the reference image recorded in the background frame, the movement amount on the screen of the background caused by the camera shake is calculated and the image 1101 is recorded as the reference region.

Then, the blur correction control is performed based on the movement amount of the background detected by the movement amount and the background frame of the second main subject detected in the tracking frame 2.

As a result of determining the clipping region by adding the movement amounts of the two at a desired ratio, the image which indicates the reference numeral 1102*b* is clipped to generate an image subjected to blur correction.

In the subsequent CntS<TrCntS periods, similarly, the tracking frame 2 is set at the position of the region 1103*d*, the movement amount on the screen of the second main subject and the movement amount on the screen of the background caused by the camera shake are calculated, and the blur correction control is performed based on the movement amounts of both. The tracking frame 2 of the next frame is set and the reference image is recorded.

At the end of the transition where CntS=TrCntS, the tracking frame 2 is set, and blur correction control by calculating the movement amount on the screen of the second main subject of the tracking frame 2 position is performed. That is, since it is detected that the second main subject has moved to the position indicated by reference numeral 1104*e*, blur correction control is performed by cutting out the region indicated by the reference numeral 1102*e*.

As described above, in the present embodiment, the main subject detection circuit 26 is responsible for the role of a main subject detecting means for performing main subject detection processing by receiving outputs from the motion vector detection circuit 27, the A/D converter circuit 5, and the CPU 15. Also, the motion vector detection circuit 27 is responsible for the role of a motion vector detecting means for detecting a motion vector by using the inputted digital image signal (base image) and the digital image signal (reference image) of one frame prior.

Also, the CPU 15 is responsible for the role of a motion separating means for identifying the first main subject or the first main subject and the second main subject based on the main subject information detected in the main subject detection circuit 26 and separating the motion vectors and of the identified first or second main subjects and the motion vectors of the background by performing the clustering processing.

Also, the CPU 15 is responsible for the role of a blur correction amount calculating means for calculating a correction ratio calculated in accordance with a count value after the occurrence of detection or change of the main subject and calculating a blur correction amount from the correction ratio and the detected first and second main subjects and background motion vectors.

Note, in the present embodiment, in order to cope with a sudden appearance or disappearance of the main subject, in a case where the appearance or disappearance of the main subject occurs during the transition of the blur correction control, the transition processing may be interrupted, and a new blur correction control transition may be immediately started. In a case where the transition period is set to about several seconds, for example, a new transition of the blur correction control may be started after waiting for the end of the transition processing. As a result, since the control always corrects only camera shake, a more stable video can be obtained.

Also, in a case where an interchangeable lens equipped with a blur correction function is mounted, an image that has already been blur corrected is formed by the interchangeable lens on the imaging element 3. In this case, what is corrected by the image stabilization apparatus of the present embodiment results from the motion of the subject and the remainder of the correction of the blur correction by the interchangeable lens.

Second Embodiment

The difference of the second embodiment from the first embodiment is that, in a case where the main subject is no longer detected, the image stabilization control is performed by detecting the motion vectors of the clipping region without performing blur correction control by tracking the subject of the central frame.

The blur correction processing in the present embodiment is also performed in the operation procedure illustrated in FIGS. 4A and 4B. However, the processing of step S407 differs from that of the first embodiment in that the region for detecting the motion vector of the subject set in step S403 is not the central frame but is the region cut out by using the image deformation clipping circuit 28 (e.g., the image 602*a* of FIG. 6).

Figure 12:
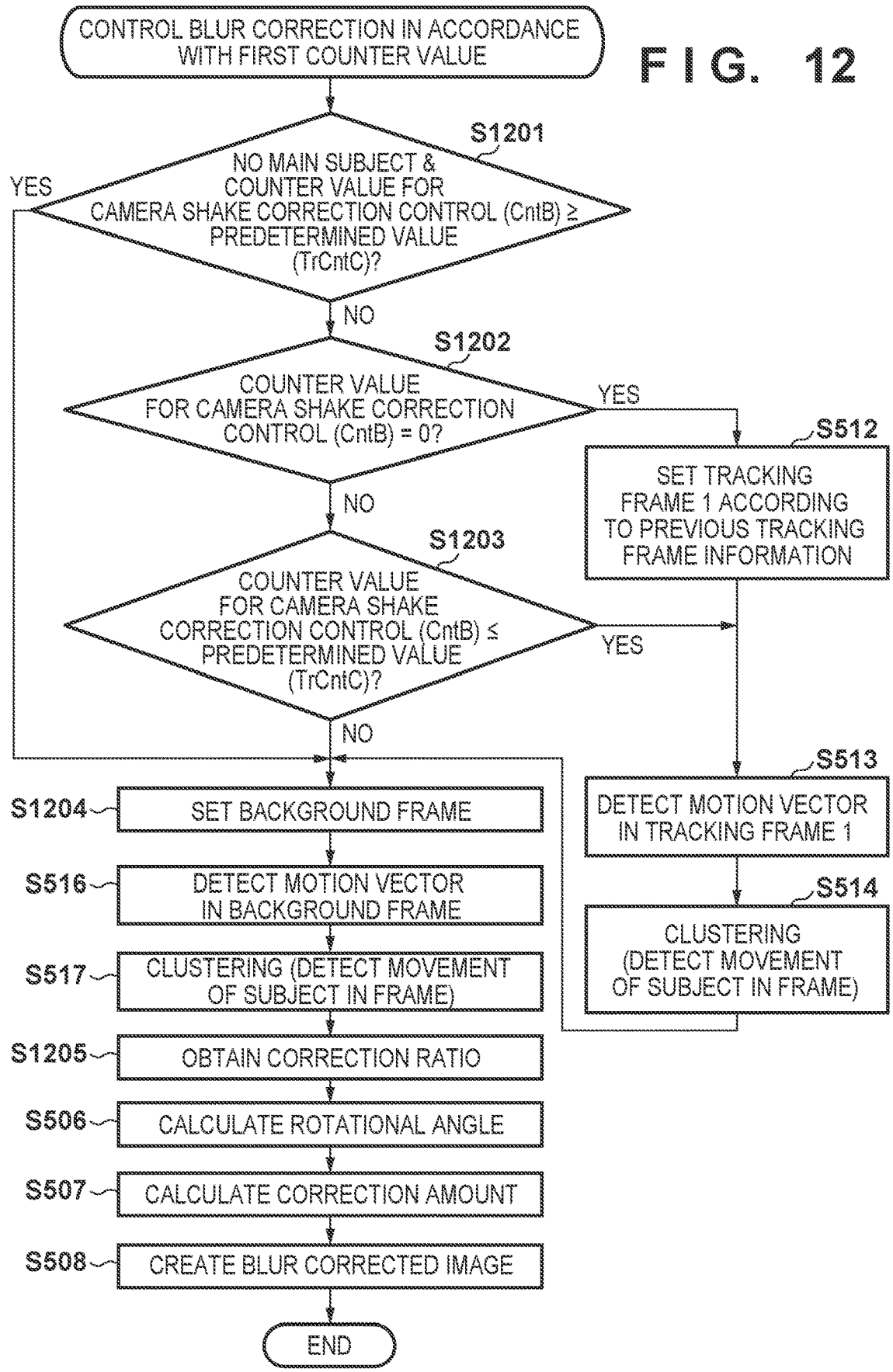
FIG. 12 is a flowchart of a blur correction control according to the first counter value in a second embodiment.

Operation procedures corresponding to step S407 of FIG. 4A in the second embodiment is described with reference to FIG. 12. The same processes as those of the first embodiment are denoted by the same reference numerals, and description thereof is omitted.

First, in step S1201, it is checked whether the transition to the blur correction control in a case where there is no main subject has already completed. This is performed by checking whether the main subject is not detected and whether the counter value (CntB) for the first blur correction control is equal to or more than the predetermined value (TrCntC) indicating the period for changing the first blur correction control. In a case where the transition to the blur correction control when the main subject is not present has already completed, the processing advances to step S1204.

In a case where the transition to the blur correction control is in progress when the main subject is not present, the processing advances to step S1202, whether the counter value (CntC) for the first blur correction control is the initial value (=0) is checked. If the counter value is the initial value, the processing advances to step S512, and the motion vector of the subject in the tracking frame 1 is detected by performing the processing of steps S512 to S514.

If the counter value is not the initial value, the processing advances to step S1203, and whether or not the counter value (CntC) for the first blur correction control is equal to or less than a predetermined value TrCntC, that is, whether or not the transition period of the blur correction control is in progress is checked. If the value is equal to or less than the predetermined value TrCntC, it is determined that the transition period is in progress, the processing advances to step S513, the processing of steps S513 and S514 is performed, and a motion vector in the tracking frame 1 is detected. If the transition period is in progress, it is determined that the transition period has ended, and the processing advances to step S1204.

A background frame is set in step S1204. This is a region excluding the tracking frame set in step S512, and is divided into a plurality of regions of an appropriate size when motion vector detection is performed. Thereafter, the processing of steps S516 and S517 is performed to detect motion vectors of the background.

In step S1205, the correction ratio α1 for the tracking frame 1 which is the region before the transition of the subject region of the blur correction control target (the first main subject) and the correction ratio α2 for the background are calculated.

The motion vector in the tracking frame 1 calculated by clustering is defined as Xmean1p and Ymean1p, and the motion vector in the background frame is defined as XmeanBp and YmeanBp. In this case, the correction amounts Xis and Yis in the horizontal and vertical directions using the correction amount ratios α1 and α2 of the tracking frame 1 and the background frame are expressed as follows.

$$Xis = \alpha1 \cdot Xmean1p + \alpha2 \cdot XmeanBp$$

$$Yis = \alpha1 \cdot Ymean1p + \alpha2 \cdot YmeanBp$$

Therefore, in a case of obtaining the ratio of the correction amount of the tracking frame 1 and the background frame in accordance with the progress of the transition of the main subject region for performing the blur correction, the following equations are used.

$$\alpha1 = (TrCntB - CntB)/TrCntB$$

$$\alpha2 = (1 - \alpha1)$$

However, α1 and α2 take values in the range of a maximum value of 1 and minimum value of 0, and when they exceed 1, the values are set to 1, and when they are less than 0, the values are set to 0. Thereafter, the processing of steps S506 to S508 is performed to create a blur corrected image.

As described above, in the above embodiment, a first motion vector representing the movement of the first main subject, a second motion vector representing the movement of the second main subject (the subject to which to change), and a third motion vector representing the movement of the background are separated. Also, in the step of changing the main subject to be subjected to the blur correction, after the blur correction amount is calculated using the motion vectors of the first main subject and the background and after passing through the blur correction amount calculation process using the motion vectors of the background, the blur correction amount is calculated by using the motion vectors of the second main subject and the background. Thus, it is possible to prevent a sudden change in the angle of view or a change in a subject shake caused by the main subject changing or the like, and to perform moving image capture with a stable composition.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-234653, filed Dec. 25, 2019 which is hereby incorporated by reference herein in its entirety.

What is claimed is:

1. An image stabilization apparatus, comprising:
at least one processor or circuit configured to function as:
a subject detection unit configured to detect a main subject;
a motion vector detection unit configured to detect a motion vector within a screen;
a separation unit configured to separate a motion vector of a main subject and a motion vector of a background;
a calculation unit configured to calculate a correction amount for correcting image blur of a subject within a screen; and
a control unit configured to, in a case where a second main subject, which is a new moving body, is detected by the subject detection unit in a state in which a target of image stabilization is set as a first main subject detected by the subject detection unit, perform control so as to transition from a state in which the calculation unit calculates the correction amount based on a first motion vector of the first main subject, via a state in which the correction amount is calculated based on a third motion vector, which is a motion vector of the background, to a state in which the correction amount is calculated based on a second motion vector of the second main subject.

2. The image stabilization apparatus according to claim 1, wherein the control unit performs control so as to transition from a state in which the calculation unit calculates the correction amount based on the first motion vector, via a state in which the correction amount is calculated based on the first motion vector and the third motion vector, a state in which the correction amount is calculated based on the third motion vector, a state in which the correction amount is calculated based on the second motion vector and the third motion vector, respectively, to a state in which the correction amount is calculated based on the second motion vector.

3. The image stabilization apparatus according to claim 2, wherein the control unit, in a case of transition from a state in which the calculation unit calculates the correction amount based on the first motion vector to a state in which the correction amount is calculated based on the first motion vector and the third motion vector, gradually lowers a ratio of the correction amount based on the first motion vector.

4. The image stabilization apparatus according to claim 2, wherein the control unit, in a case where it transitions from a state in which the calculation unit calculates the correction amount based on the second motion vector and the third motion vector to a state in which the correction amount is calculated based on the second motion vector, gradually increases a ratio of the correction amount based on the second motion vector.

5. The image stabilization apparatus according to claim 2, wherein in a state where the calculation unit calculates the correction amount based on the first motion vector and the third motion vector, the motion vector detection unit obtains the first motion vector, the second motion vector, and the third motion vector, respectively.

6. The image stabilization apparatus according to claim 5, wherein in a state where the calculation unit calculates the correction amount based on the first motion vector and the third motion vector, the motion vector detection unit detects the third motion vector in regards to a region other than the region for obtaining the first motion vector and a region for obtaining the second motion vector.

7. The image stabilization apparatus according to claim 2, wherein in a state where the calculation unit calculates the correction amount based on the second motion vector and the third motion vector, the motion vector detection unit obtains at least the second motion vector and the third motion vector, respectively.

8. The image stabilization apparatus according to claim 7, wherein in a state where the calculation unit calculates the correction amount based on the second motion vector and the third motion vector, the motion vector detection unit detects the third motion vector in regards to a region other than a region for obtaining the second motion vector.

9. The image stabilization apparatus according to claim 1, wherein the second main subject is a subject newly detected in a state in which the first main subject is set as a target of image stabilization.

10. The image stabilization apparatus according to claim 1, wherein in a case where the subject detection unit cannot detect the first main subject and the second main subject, the calculation unit calculates the correction amount based on a fourth motion vector representing a movement of a main subject in a central portion of the screen.

11. The image stabilization apparatus according to claim 1, wherein in a case where the subject detection unit cannot detect the first main subject and the second main subject, the calculation unit calculates the correction amount based on the third motion vector.

12. The image stabilization apparatus according to claim 1, wherein the subject detection unit detects a main subject based on an instruction from a photographer.

13. The image stabilization apparatus according to claim 1, further comprising a correction device configured to correct image blur of a subject by image processing based on the correction amount.

14. A method of controlling an image stabilization apparatus, the method comprising:
 detecting a main subject;
 detecting a motion vector within a screen;
 separating a motion vector of a main subject and a motion vector of a background;
 calculating a correction amount for correcting image blur of a subject within a screen; and
 controlling, in a case where a second main subject, which is a new moving body, is detected by the subject detection in a state in which a target of image stabilization is set as a first main subject detected by the subject detection, so as to transition from a state in which the calculation calculates the correction amount based on a first motion vector of the first main subject, via a state in which the correction amount is calculated based on the third motion vector, which is a motion vector of the background, to a state in which the correction amount is calculated based on a second motion vector of the second main subject.

15. A non-transitory computer readable storage medium storing a program causing a computer to function as an image stabilization apparatus comprising:
 detecting a main subject;
 detecting a motion vector within a screen;
 separating a motion vector of a main subject and a motion vector of a background;
 calculating a correction amount for correcting image blur of a subject within a screen; and
 controlling, in a case where a second main subject, which is a new moving body, is detected by the subject detection in a state in which a target of image stabilization is set as a first main subject detected by the subject detection, so as to transition from a state in which the calculation calculates the correction amount based on a first motion vector of the first main subject, via a state in which the correction amount is calculated based on the third motion vector, which is a motion vector of the background, to a state in which the correction amount is calculated based on a second motion vector of the second main subject.

* * * * *